(12) United States Patent
Oaku et al.

(10) Patent No.: US 6,667,077 B1
(45) Date of Patent: Dec. 23, 2003

(54) LIQUID CRYSTAL DISPLAY DEVICE

(75) Inventors: Hitoshi Oaku, Hitachi (JP); Hiroyuki Kagawa, Hitachi (JP); Kotaro Araya, Hitachiota (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/651,672

(22) Filed: Aug. 30, 2000

(30) Foreign Application Priority Data

Sep. 10, 1999 (JP) .......................................... 11-256715
Oct. 25, 1999 (JP) .......................................... 11-302016

(51) Int. Cl.⁷ .............................................. C09K 19/00
(52) U.S. Cl. .................................. 428/1.1; 252/299.01
(58) Field of Search ...................... 428/1.1; 252/299.01, 252/299.3, 299.6

(56) References Cited

U.S. PATENT DOCUMENTS

| | | | | |
|---|---|---|---|---|
| 4,550,981 A | * | 11/1985 | Petrzilka et al. | 252/299.63 |
| 4,704,005 A | * | 11/1987 | Boller et al. | 252/299.6 |
| 4,792,211 A | * | 12/1988 | Harada et al. | 350/341 |
| 5,800,733 A | * | 9/1998 | Kelly | 252/299.6 |
| 6,054,190 A | * | 4/2000 | Ogawa et al. | 427/510 |
| 6,190,576 B1 | * | 2/2001 | Andou et al. | 252/299.63 |
| 6,210,760 B1 | * | 4/2001 | Weber et al. | 428/1.1 |
| 6,231,934 B1 | * | 5/2001 | Kondo et al. | 428/1.1 |
| 6,249,325 B1 | * | 6/2001 | Ohkawara et al. | 349/38 |
| 6,297,867 B1 | * | 10/2001 | Miyahara et al. | 349/141 |
| 6,346,932 B1 | * | 2/2002 | Maeda | 345/90 |

FOREIGN PATENT DOCUMENTS

| | | | | |
|---|---|---|---|---|
| JP | 06-222397 | | 8/1994 | |
| WO | WO97/35822 | * | 9/1998 | C09K/19/34 |

OTHER PUBLICATIONS

Ohe, et al. Journal of Applied Physics vol. 82, No. 2, Jul. 15, 1997, pp. 528–535, "Switching of negative and positive dielectro–anisotropic liquid crystals by in–plane electric fields".

Oh–e, et al., Jpn. Appl. Phys vol. 36(1997) pp. L1025–L1028, Part 2, No. 8A, Aug. 1, 1997, "Unusual Voltage–Holding Ratio Characteristics Using In–Plane Switching of Nematic Liquid Crystal".

Tanaka, et al.IDW '97 pp. 41–44, "Low Temperature Stability of Liquid Crystal Mixtures".

Fedors, Polymer Engineering and Sciences, Feb., 1974, vol. 14, No. 2, pp. 147–154, "A Method for Estimating Both the Solubility Parameters and Molar Volumes of Liquids".

Nakazono, et al., "Physical Properties of Liquid–Crystalline Materials Related to Image Sticking Phenomena of AM–LCD", pp. 29–34.

* cited by examiner

*Primary Examiner*—Mark F. Huff
*Assistant Examiner*—Jennifer R Sadula
(74) *Attorney, Agent, or Firm*—Antonelli, Terry, Stout & Kraus, LLP

(57) ABSTRACT

In an active matrix type liquid crystal display device using a liquid crystal of negative dielectric anisotropy, low voltage driving and high quality display are made compatible. A liquid crystal display device 50 has: a pair of substrates 1, 14; a liquid crystal layer 9; a common electrode 2, a pixel electrode 5, a signal electrode 6, and an active element 16 arranged on the substrate 1 so that an electric field 25 parallel to the plane of the substrate is generated by applying a voltage; alignment film 8, 10 formed on the substrate 1, 14; and a polarizer 15; wherein the liquid crystal 9 of negative dielectric anisotropy containing liquid crystal molecule having dicyanobenzene structure in its molecule structure is used. Within the allowable range, in which the display quality of images of the liquid crystal display device is not lowered, the voltage holding rate is maintained, and low voltage driving becomes possible.

31 Claims, 7 Drawing Sheets

FIG. 2 FIG. 2B
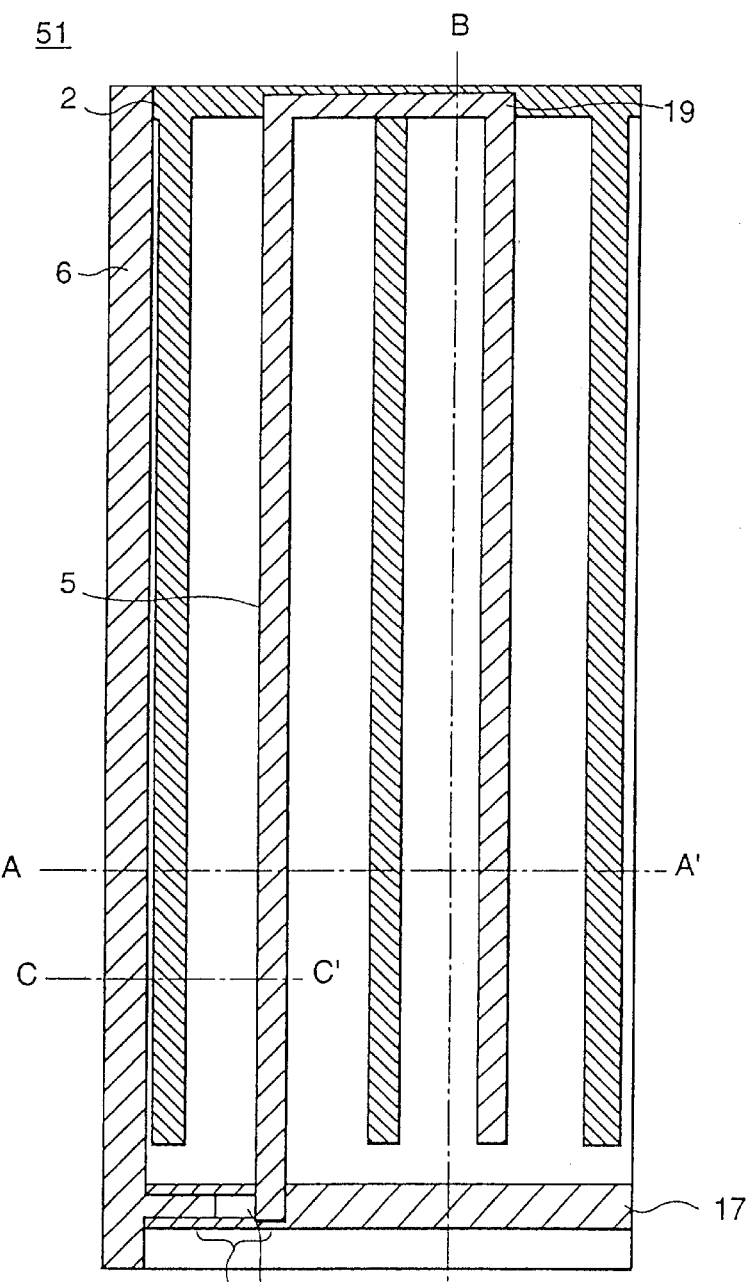
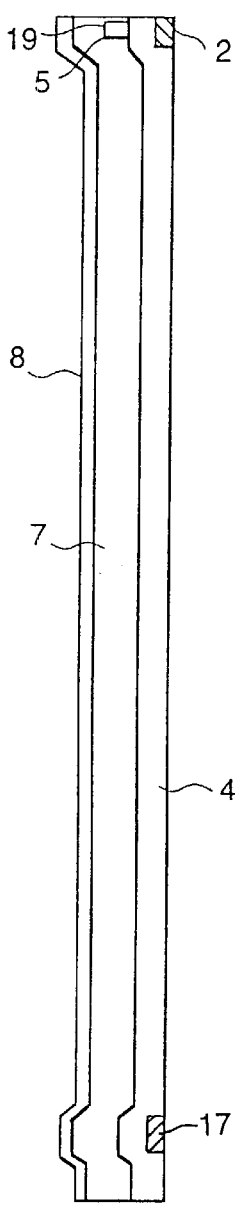
FIG. 2A

LIQUID CRYSTAL DISPLAY DEVICE

BACKGROUND OF THE INVENTION

The present invention relates to an in-plane switching type active driving liquid crystal display device, wherein a liquid crystal is operated by an electric field which extends in a plane substantially parallel to the substrate; and, in particular, the invention relates to an in-plane switching type active driving liquid crystal display device using a liquid crystal having a negative dielectric anisotropy.

A liquid crystal display device displays images by utilizing the optical change of a liquid crystal layer generated by changing the orientating direction of the liquid crystal when an electric field is applied to the liquid crystal interposed between a pair of substrates.

The conventional active driving liquid crystal display device is represented by a twisted nematic (TN) type liquid crystal display device. In accordance with the TN type liquid crystal display device, electrodes are provided, respectively, on the upper substrate and the lower substrate between which the liquid crystal is disposed; the electrodes are arranged so that an electric field between the electrodes is applied to the liquid crystal in a direction perpendicular to the substrate plane; and the image display is performed by utilizing the rotating optical characteristic of the liquid crystal layer. One of the serious problems inherent in the TN type active driving liquid crystal display device is the narrowness of the viewing angle.

In order to maintain a high display quality(contrast ratio), a high voltage holding rate is necessary. In order to achieve the high voltage holding rate, use of a liquid crystal having an extremely high specific resistance is indispensable.

The liquid crystal used for the liquid crystal display device is generally composed of a composition of various liquid crystal molecules consisting of high polar liquid crystal molecules for providing a designated dielectric anisotropy, and low polar liquid crystal molecules for adjusting the liquid crystal characteristics other than the dielectric anisotropy, such as viscosity, the temperature range of the liquid crystal condition, and others.

In order to realize such a high specific resistance value, it is necessary to restrict the kind of liquid crystal molecule to be used with a view toward making the liquid crystal highly resistant, that is, in view of the readiness of purification. Accordingly, use of a liquid crystal molecule having a cyano group in its molecule as the high polar liquid crystal molecular component tends to be avoided as much as possible. As a result, the range of selection of the liquid crystal molecule component, in particular, the range of selection of a high polar liquid crystal molecular component, becomes generally quite narrow.

On the other hand, currently, an in-plane switching (IPS) type liquid crystal display device has been developed, wherein comb-teeth electrodes are used; the liquid crystal is operated in response to an electric field that has a major component disposed in parallel to the substrate; and display is performed by utilizing the birefringence of the liquid crystal. An example of this IPS type of display device has been disclosed in JP-A-6-222397 (1994).

The IPS type liquid crystal display device has a wider viewing angle than the TN type liquid crystal display device, because of in-plane switching of the liquid crystal molecule, and it has other advantages, such as a low load capacity and others. Therefore, currently, the technology related to the IPS type liquid crystal display device has been rapidly progressing as a new active driving type liquid crystal display device which can be substituted for the conventional TN type liquid crystal display device.

In accordance with the IPS system, a more perfect in-plane switching can be realized when the liquid crystal has a negative dielectric anisotropy, in comparison with a case when the liquid crystal has a positive dielectric anisotropy, as disclosed in M. Oh-e, M. Yoneya, and K. Kondo, Journal of Applied Physics, 1997, Vol. 82, No. 4, 528–535. Achievement of such a perfect in-plane switching makes it possible to broaden the viewing angle of the liquid crystal display device, including half tone display, perfectly.

Accordingly, in view of the above advantage, the liquid crystal used in the IPS system desirably has a negative dielectric anisotropy.

However, as long as active driving is used, the high voltage holding rate is an indispensable condition even in the IPS system. A remarkably high resistance is required for the liquid crystal as well as the conventional TN system. In this case, a liquid crystal of negative dielectric anisotropy may generate a new problem.

The problem relates to variation of the liquid crystal molecule. That is, in order to realize the negative dielectric anisotropy of the liquid crystal molecule, the dielectric constant in a direction of the minor axis perpendicular to the longitudinal direction of the liquid crystal molecule must be made larger than that in the longitudinal direction of the liquid crystal molecule. However, in order to realize the above condition, a large restriction exists in the molecular design, because the conjugated group can not be extended arbitrarily in the minor axis direction of the liquid crystal molecule. Conventionally, the active driving TN type liquid crystal display device uses a liquid crystal of positive dielectric anisotropy, and a liquid crystal of negative dielectric anisotropy has not been called for in particular. Therefore, the technology concerning a liquid crystal of negative dielectric anisotropy has not been developed yet, and a variation of the available liquid crystal molecule is extremely small.

Therefore, the range of the selection of the liquid crystal molecule for a liquid crystal of negative dielectric anisotropy is very small; in particular, the kinds of high polar liquid crystal molecule, which can be used for providing a desirable dielectric anisotropy, is extremely small. Accordingly, when a liquid crystal of negative dielectric anisotropy is used, there is a possibility that the liquid crystal display device will not be able to attain desired characteristics. In particular, there is a concern that that the driving voltage will need to be increased significantly, because the dielectric anisotropy can not be increased sufficiently.

However, currently, a new finding on the IPS type liquid crystal display device was disclosed in M. Oh-e, Y. Umeda, M. Ohta, S. Aratani, and K. Kondo, Japan Journal of Applied Physics, Vol. 36 (1997), Part 2, No. 8A, pp. L1025–L1028. By using a component of electric field parallel to the substrate, the IPS system can utilize substrates and an orientation layer between the substrates and the liquid crystal as a storage capacitor, and the liquid crystal display device can maintain a high voltage holding rate. In comparison with a conventional TN system, the decrease in the voltage holding rate is small, even if a liquid crystal having a low specific resistance is used.

Accordingly, it was revealed that such an IPS system provides a possibility to broaden the range of selection of usable liquid crystal molecules, in particular, the range of selection of a high polar component liquid crystal, in comparison with conventional TN system.

In view of the above, the inventors have achieved the present invention disclosed hereinafter by studying the use of a liquid crystal of negative dielectric anisotropy in an IPS system.

SUMMARY OF THE INVENTION

Accordingly, the present invention has the object of providing a liquid crystal display device using a liquid crystal of negative dielectric anisotropy, which is usable in an in-plane switching type liquid crystal display device.

The liquid crystal display device in accordance with a first aspect of the present invention is able to solve the above problems by providing:

A liquid crystal display device comprising a pair of substrates; a liquid crystal layer held between the pair of substrates; and pixel electrodes, common electrodes, and active elements arranged on at least one of the pair of substrates, the liquid crystal molecules in the liquid crystal layer being controlled by applying a voltage between a pixel electrode and a common electrode; wherein, the liquid crystal layer has a negative dielectric anisotropy by containing liquid crystal molecules having a dicyanobenzene structure in its molecular structure.

The liquid crystal display device in accordance with a second aspect of the present invention provides:

A liquid crystal display device comprising a pair of substrates; a liquid crystal layer held between the pair of substrates; and pixel electrodes, common electrodes, and thin film transistors arranged on at least one of the pair of substrates the liquid crystal molecules in the liquid crystal layer being controlled by applying a voltage between a pixel electrode and a common electrode; wherein, the liquid crystal material in the liquid crystal layer has a negative dielectric anisotropy by containing liquid crystal molecules which contain a cyano structure in its molecular structure; and at least one of the pixel electrode and the common electrode is composed of a transparent conductive film.

Furthermore, at least a part of the pixel electrode and the common electrode of the liquid crystal display device are overlapped via an insulating film to form an additive capacitor.

The transparent conductive film of the liquid crystal display device is an Indium-Tin-Oxide (ITO) film.

The insulating film held between the pixel electrode and the common electrode of the liquid crystal display device is made of a material selected from the group consisting of silicon nitride, titanium oxide, and silicon oxide.

The liquid crystal material in the liquid crystal layer of the liquid crystal display device is composed of liquid crystal molecules, including liquid crystal molecules having a negative dielectric anisotropy by having a dicyanobenzene structure in its molecular structure.

BRIEF DESCRIPTION OF THE DRAWINGS

These and other objects, features and advantages of the present invention will be understood more clearly from the following detailed description, when taken with reference to the accompanying drawings, wherein.

FIG. 2 is a schematic plan view indicating the electrode structure of the liquid crystal display device of FIG. 1, according to the present invention;

FIG. 2A is a section view taken along line A–A' in FIG. 2;

FIG. 2B is a section view taken along line B–B' in FIG. 2;

FIG. 7A is a schematic cross-section taken along line A–A' in FIG. 7;

DETAILED DESCRIPTION OF THE PREFERRED EMBODIMENTS

The present invention was achieved as a result of the findings described above, which were obtained during the study of the use of a liquid crystal material of negative dielectric anisotropy in an IPS type liquid crystal display device.

That is, the liquid crystal molecule, the purification of which is difficult because of its high polarity, making the specific resistance of the liquid crystal low, is difficult to use in a conventional TN system, because of concerns for a decrease in its voltage holding rate. However, the IPS system has a feature in that a decrease in the voltage holding rate hardly occurs, and so the restriction for a liquid crystal from the point of view of the voltage holding rate is relatively low. Accordingly, some of the liquid crystal molecules, which are usable in the IPS system, must be included in the group of high polar liquid crystal molecules for which there is a concern as to the difficulty to make the liquid crystal have a high specific resistance.

Accordingly, even if the liquid crystal of negative dielectric anisotropy has essentially a small variation, the IPS system makes it possible to utilize a larger number of and more useful liquid crystal molecules in the variation in comparison with the conventional TN system, and a liquid crystal of higher performance can be obtained by combining these liquid crystal molecules.

In view of the above advantages, the liquid crystal containing a liquid crystal molecule having a cyano structure in its molecule structure, which has been thought to be difficult to use in the conventional TN system because of the concern for its specific resistance, was studied.

Figure 1:
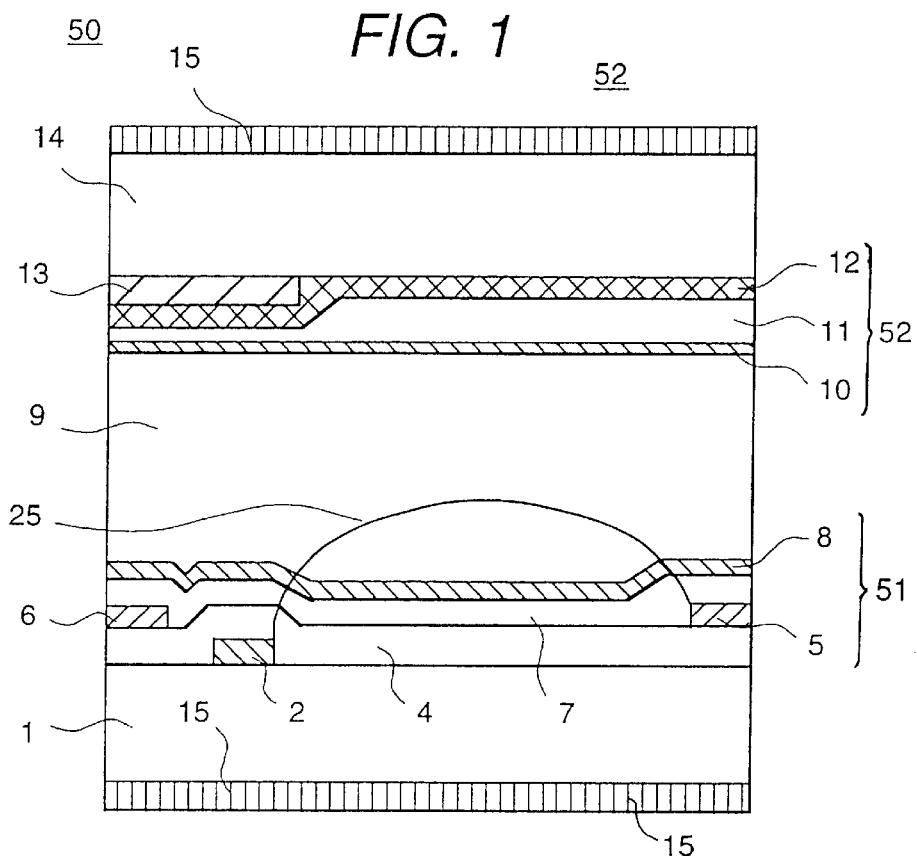
FIG. 1 is a schematic transverse cross section of a pixel portion showing the composition of a liquid crystal display device according to present invention.

FIG. 1 is a schematic transverse cross section of a pixel portion for is explaining the composition of a liquid crystal display device, which produces a first execution state in accordance with the present invention. FIG. 2 is a schematic plan view indicating the electrode structure of the liquid crystal display device, which produces the first execution state according to the present invention.

As indicated in FIG. 1 and FIG. 2, the liquid crystal display device 50 comprises a pair of substrates 1, 14 made of transparent glass; and a liquid crystal 9 is interposed between the pair of substrates 1, 14. A common electrode 2, a pixel electrode 5, a signal electrode 6, and thin film transistors (TFT) 16 operating as an active element, are formed on the substrate 1 so that an electric field having a component parallel to the plane of the substrate at the liquid crystal side (the electric field is expressed schematically by the reference numeral 25 in FIG. 1) is generated by applying a voltage thereto. A liquid crystal orientation control layer (hereinafter, called an alignment film) 8 is formed on a plane in contact with the liquid crystal 9 interposed between the substrates 1, 14; and, a polarizer 15, which operates as an optical means for changing the optical characteristics corresponding to the orientation condition of the liquid crystal, is disposed on the outside surface of the substrate 14.

As the active element, a thin film diode is also usable, but use of the TFT is desirable, because of its superior characteristics as a switching element.

The liquid crystal display device 50 displays images by generating an electric field 25 between the common electrode 2 and the pixel electrode 5 with operation of the thin film transistor 16; and with application of the electric field 25, the liquid crystal molecules in the liquid crystal 9 perform a switching operation in a plane approximately parallel to the substrate 1 so as to cross perpendicularly the electric field 25.

In the liquid crystal display device of the present invention as indicated above, a liquid crystal indicating a negative dielectric anisotropy, which contains liquid crystal molecule having a cyano structure in its molecule, was studied. As a result, it was revealed that the voltage holding rate could be maintained in an allowable range, which did not lower the display quality of the liquid crystal display device so much.

Practically, it was revealed that the liquid crystal material containing a liquid crystal molecule having a cyanobenzene structure, a cyanocyclohexane structure, or a cyanodioxane structure expressed by the following chemical formula 5 in its molecule structure, respectively, was usable:

(chemical formula 5)

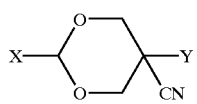

where, X and Y indicate atomic groups constituting other structure portions of the liquid crystal molecule.

As a result of the determination the liquid crystal molecule having a cyano structure in its molecule structure is usable, it is seen that a liquid crystal having a larger negative dielectric anisotropy than ever can be readily prepared. As a result, the driving voltage of the IPS type liquid crystal display device can be readily decreased, and a high performance can be readily realized.

Furthermore, the liquid crystal molecule having a dicyanobenzene structure expressed by the following chemical formula 8 in its molecule structure, which is of concern due to its low specific resistance, because the molecule is a high polar molecule, and its purification is very difficult, was studied using the above-described liquid crystal display device, which produces the first execution state according to the present invention. As a result, it was revealed that the molecule was usable.

(chemical formula 8)

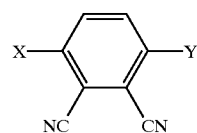

Here, X and Y indicate substituted groups of similar or different structures from each other.

Practically, the liquid crystal containing the liquid crystal molecules expressed by the following chemical formulas 9 and 10 were usable:

(chemical formula 9)

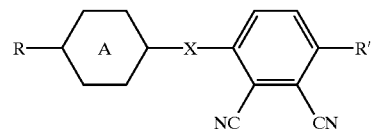

(chemical formula 10)

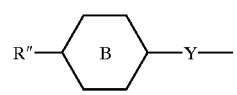

Here, R, R', R" are straight chain alkyl group or branched chain alkyl group, straight chain alkoxy group or branched chain alkoxy group in an aromatic ring; or one of R, R' is a substituted group expressed by the chemical formula 10, and the other of the R, R', is a straight chain alkyl group or a branched chain alkyl group, a straight chain alkoxy group or a branched chain alkoxy group in an aromatic ring; X, Y are a single covalent bond, respectively, or one of x, Y is —CH$_2$—CH$_2$— (ethylene), and the other is a single covalent bond; ring structures A, B are 1,4-phenylen, or trans-1,4-cyclohexylene when one of X, Y is —CH$_2$—CH$_2$— (ethylene).

Furthermore, it was revealed that the liquid crystal containing the liquid crystal molecules expressed by the following chemical formula 1 was usable:

(chemical formula 1)

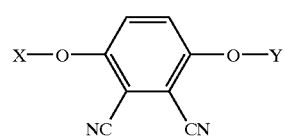

Here, X and Y indicate substituted groups of similar structure, or different structures from each other.

Practically, the liquid crystal containing the liquid crystal molecules expressed by the following chemical formulas 2 to 4 were usable:

(chemical formula 2)

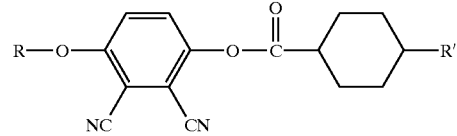

-continued

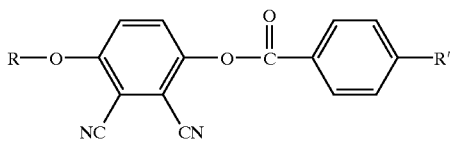
(chemical formula 3)

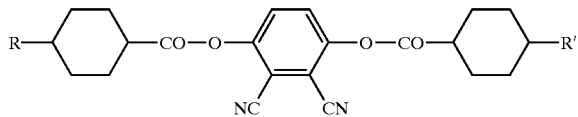
(chemical formula 4)

Here, R expresses a straight chain alkyl group, branched chain alkyl group, or alkyl substituted cycloalkyl group, R' expresses a straight chain or branched chain alkyl.group, straight chain or benched chain alkoxy group, or alkyl substituted cycloalkyl group.

The liquid crystal molecule having a dicyano structure is known to have a significantly large negative dielectric anisotropy. For instance, the dielectric anisotropy of the liquid crystal molecule expressed by the chemical formula 11 is −22:

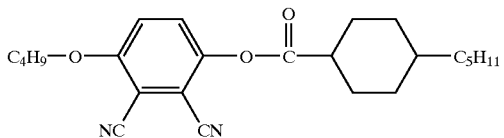

By use of a liquid crystal molecule having a dicyano structure in its molecular structure, preparation of a liquid crystal having an even larger negative dielectric anisotropy becomes possible; and, as a result, the driving voltage of the IPS type liquid crystal display device can be readily decreased, and a high performance can be readily realized.

As clearly indicated in the above first execution state, if the storage capacitor is further increased, it may be effective for achieving a further high voltage holding rate, because the IPS type liquid crystal display device realizes a high voltage holding rate by utilizing the substrates and the orientation layer as a storage capacitor. In this case, if the storage capacitor is formed by a conventionally known general method in the pixel area, the aperture ratio of the pixel is decreased, and the brightness of the liquid crystal display device is lost.

Therefore, to produce a second execution state in accordance with the present invention, the composition of the IPS type liquid crystal display device was studied. In accordance with the composition, at least one of, or both of, the pixel electrode and the common electrode, which generate an electric field in the liquid crystal in response to the application of a voltage thereto, is formed with transparent conductive film; and, an additive capacitor is formed by overlapping a part of the pixel electrode and the common electrode on each other at the opening portion of the pixel with an insulating film interposed therebetween for ensuring insulation, in order to utilize the additive capacitor at the overlapping portion as a storage capacitor without decreasing the area of the opening portion of the pixel.

Figure 3:
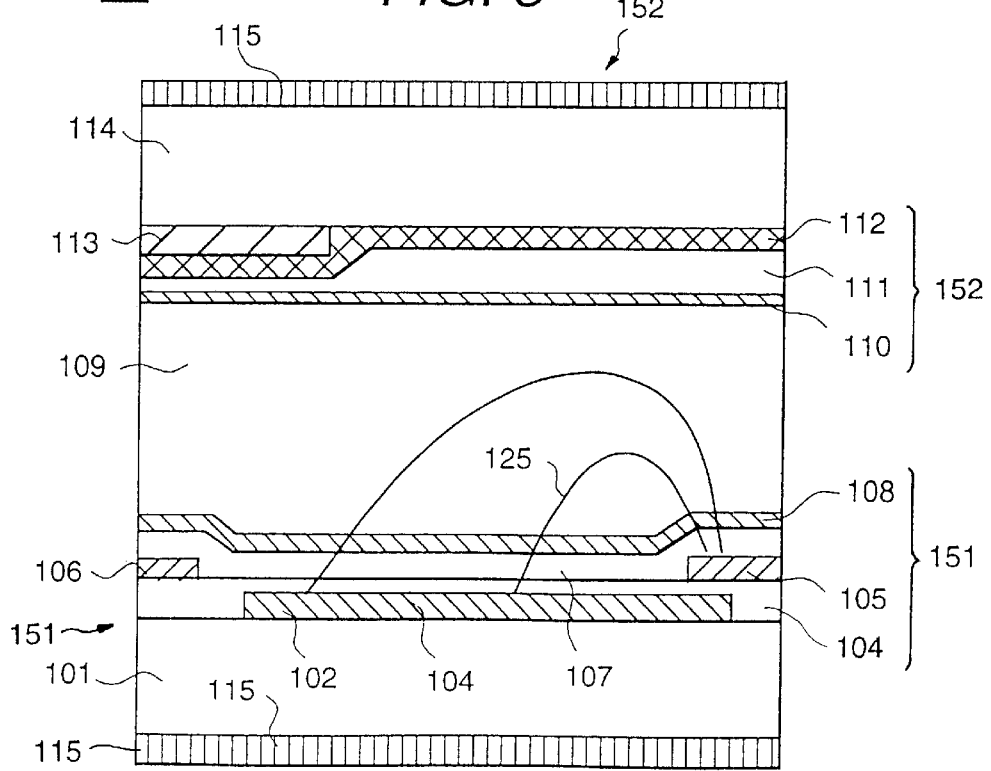
FIG. 3 is a schematic transverse cross section of a pixel portion showing the composition of another liquid crystal display device according to the present invention.
Figures 4, 4B:
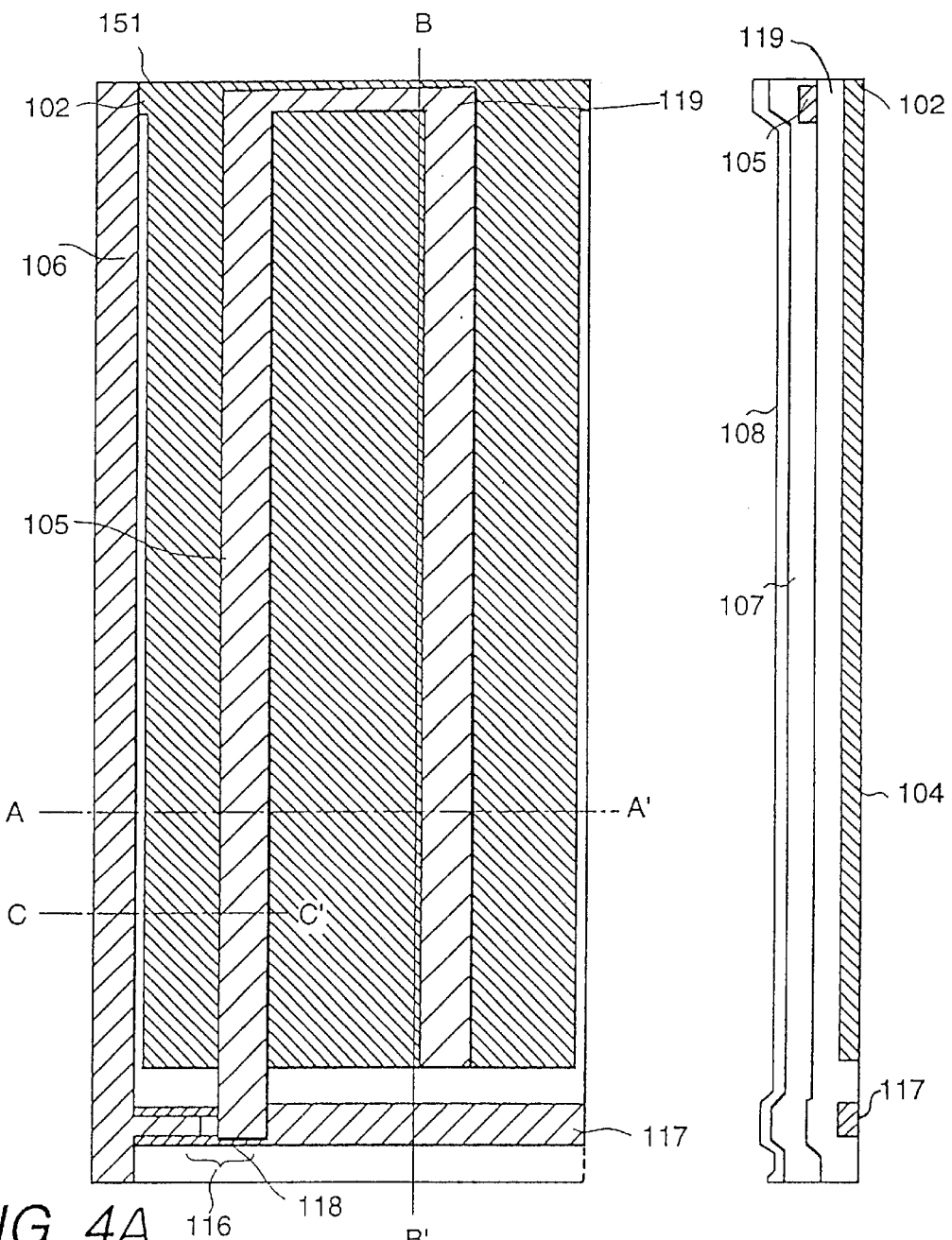
FIG. 4 is a schematic plan view indicating the electrode structure of the liquid crystal display device of FIG. 3 according to the present invention.
FIG. 4B is a section view taken along a line B—B in FIG. 4.

FIG. 3 is a schematic transverse cross section of a pixel portion for explaining the composition of a liquid crystal display device, which produces the second execution state in accordance with the present invention. FIG. 4 is a schematic plan view indicating the electrode structure of this liquid crystal display device.

As indicated in FIG. 3 and FIG. 4, the liquid crystal display device 150, which produces the second execution state in accordance with the present invention, comprises a pair of substrates 101, 114 made of transparent glass, and a liquid crystal 109 interposed between the pair of substrates 101, 114. A common electrode 102, a pixel electrode 105, a signal electrode 106, and thin film transistors (TFT) 116, which operates as an active element, are formed on the substrate 101 so that an electric field having a component parallel to the plane of the substrate at the liquid crystal side (the electric field is expressed schematically by the reference numeral 125 in FIG. 3) is generated by applying a voltage thereto. A liquid crystal orientation control layer (hereinafter, called an alignment film) 108 is formed on a plane in contact with the liquid crystal 109 interposed between the substrates 101, 114; and, a polarizer 115, which serves as an optical means for changing optical characteristics corresponding to the orientation condition of the liquid crystal is provided on the outside surface of the substrate 114.

In accordance with the structure of the liquid crystal display device 150, at least one of the pixel electrode 105 and the common electrode 102 is composed of a transparent conductive film, and a part of the pixel electrode 105 end the common electrode 102 are overlapped on each other via the insulating film 104 at the opening of the pixel to form an additive capacitor. An electric field 125 is generated between the common electrode 102 and the pixel electrode 105 by operating the thin film transistor 116, and images are displayed by making the liquid crystal molecules of the liquid crystal 109 perform a switching operation to cross the electric field perpendicularly in a plane approximately parallel to the substrate 101.

In accordance with the present invention, an IPS type liquid crystal display device can be realized, wherein at least one of, or both of, the pixel electrode and the common electrode, which generate an electric field in the liquid crystal layer when a voltage is applied thereto, is composed of a transparent conductive film; their insulation is ensured by interposing an insulating film between them; and an additive capacitor is formed by overlapping one of the electrodes on the other electrode with substantially its whole area at the opening portion of the pixel in order to utilize the additive capacitor at the overlapping portion as a storage capacitor without decreasing the opening area of the pixel.

In accordance with the liquid crystal display device explained above, it is not necessary to perform comb shape patterning of the common electrode at the lower layer, with the result that the manufacturing steps can be simplified and the storage capacitor can be formed readily. Such a liquid crystal display device was studied as a device for producing a third execution state in accordance with the present invention.

Figure 5:
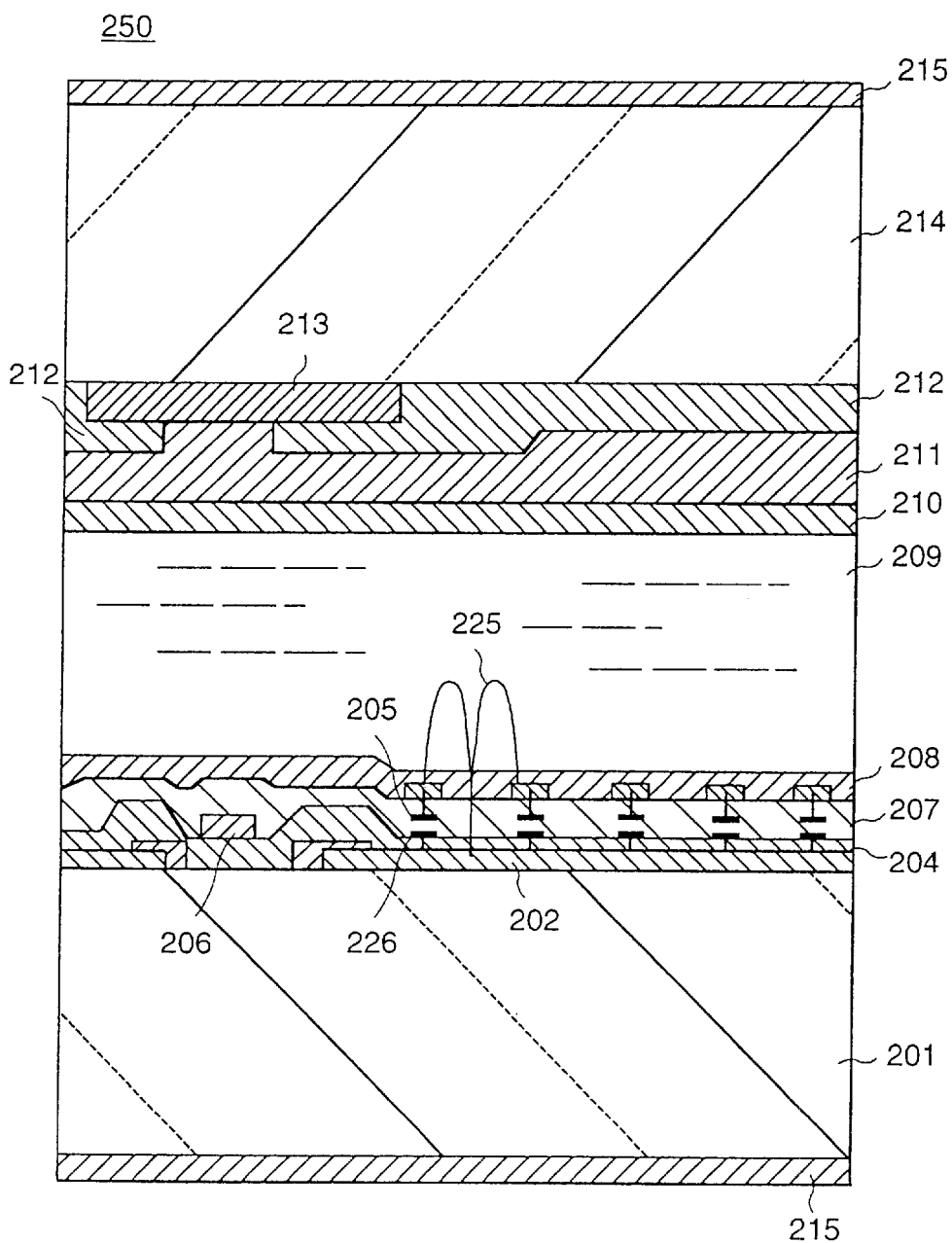
FIG. 5 is a schematic transverse cross section of a pixel portion showing the composition of yet another liquid crystal display device according to the present invention.
Figure 6:
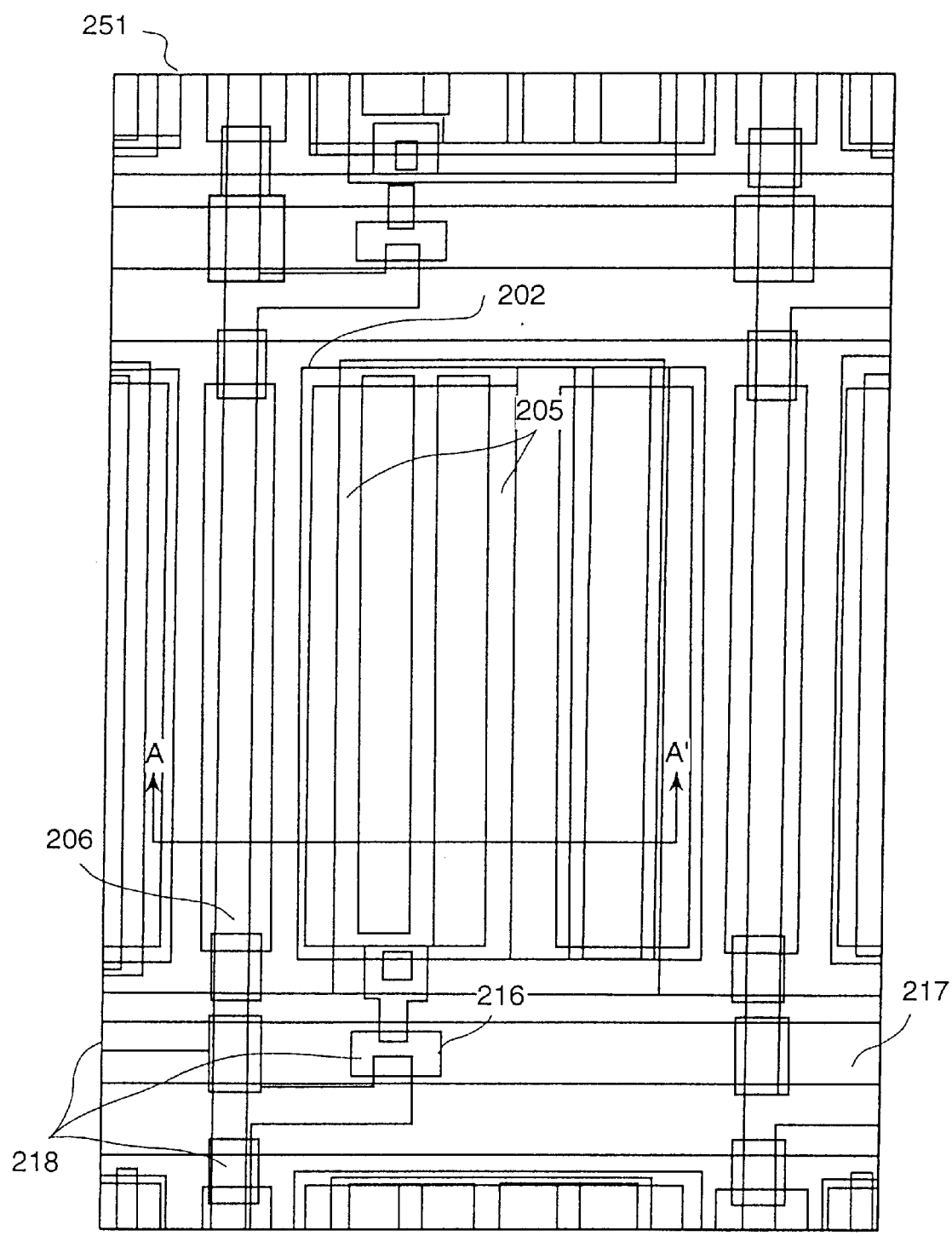
FIG. 6 is a schematic plan view indicating the electrode structure of the liquid crystal display device of FIG. 5, according to the present invention.

FIG. 5 is a schematic transverse cross section of a pixel portion for explaining the composition of a liquid crystal display device, which produces the third execution state in accordance with the present invention. FIG. 6 is a schematic plan view indicating the electrode structure of this liquid crystal display device.

As indicated in FIG. 5 and FIG. 6, the liquid crystal display device 250, which produces the third execution state in accordance with the present invention, comprises a pair of substrates 201, 214 made of transparent glass, and a liquid crystal 209 interposed between the pair of substrates 201, 214.

A common electrode 202, a pixel electrode 205, a signal electrode 206, and thin film transistors (TFT) 216, which operates as an active element, are formed on the substrate 201, so that an electric field having a component parallel to the plane of the substrate at the liquid crystal side (the electric field is expressed schematically by the reference numeral 225 in FIG. 5) is generated by applying a voltage thereto. A liquid crystal orientation control layer (hereinafter, called an alignment film) 208 is formed on a plane in contact with the liquid crystal 209 interposed between the substrates 201, 214; and, a polarizer 215, which serves as an optical means for changing optical characteristics corresponding to the orientation condition of the liquid crystal, is disposed on the outer surface of the substrate 214.

In accordance with the liquid crystal display device 250, at least one of the pixel electrode 205 and the common electrode 202 is composed of a transparent conductive film, and the pixel electrode 205 and the common electrode 202 are overlapped on each other via the insulating film 204, 207 at the opening of the pixel to form an additive capacitor 226. An electric field 225 is generated between the common electrode 202 and the pixel electrode 205 by operating the thin film transistor 216, and images are displayed by making the liquid crystal molecules of the liquid crystal 209 perform a switching operation to cross the electric field 225 perpendicularly in a plane approximately parallel to the substrate 201.

In accordance with the electrode structures explained above, which produce the second and third execution states in accordance with the present invention, the storage capacitor can be formed at the pixel portion without decreasing the aperture ratio, a high voltage holding rate becomes possible, and a liquid crystal display device of high display quality can be realized.

In this case, the material of the transparent conductive film composing at least one of the pixel electrode and the common electrode is not particularly restricted, but indium-tin-oxide (ITO) is desirable in view of its readiness in manufacturing, its high reliability, and other factors.

The insulating film interposed between the overlapping portion is not restricted particularly, but materials having high reliability, such as silicon nitride, titanium oxide, silicon oxide, and their mixture are usable.

Regarding the liquid crystal, it is possible to use a liquid crystal material containing liquid crystal molecules having a cyanobenzene structure, a cyanocyclohexane structure, and a cyanodioxane structure indicated by the chemical formula 5 in its molecular structure; a liquid crystal molecule having a dicyanobenzene structure indicated by the chemical formula 8 in its molecular structure; practically, a liquid crystal material containing the liquid crystal molecules indicated by the chemical formula 9 and the chemical formula 10; a liquid crystal material containing liquid crystal molecules, which are 2,3-dicyanohydroquinone derivatives indicated by the chemical formula 1; practically, a liquid crystal material containing the liquid crystal molecules indicated by the chemical formula 2, the chemical formula 3, and the chemical formula 4. All of the foregoing liquid crystal materials have been indicated as usable in connection with the liquid crystal display device for producing the first execution state in accordance with the present invention, such as a liquid crystal indicating a negative dielectric anisotropy by containing liquid crystal molecules having a cyano structure in its molecular structure and the like, and it has been revealed that the image quality is not damaged even with the liquid crystal display devices which produce the second and third execution states.

However, as a result of a study of liquid crystal materials having a negative dielectric anisotropy containing liquid crystal molecules having a cyano structure, in particular, a dicyano structure in its molecule with the IPS type liquid crystal display device, new issues have been revealed, simultaneously.

One of the issues is the solubility of the liquid crystal molecule having a dicyanobenzene structure in its molecular structure, and the other is a problem of so-called failure of the residual image of the liquid crystal display device.

The issue concerning the solubility of the liquid crystal molecule having a dicyanobenzene structure in its molecular structure appeared as a problem wherein the stability at a low temperature of the liquid crystal material, to which a liquid crystal molecule having a dicyanobenzene structure in its molecular structure, was decreased significantly more than expected, and preparation of the liquid crystal with a desired ratio was impossible, because the component of the liquid crystal molecule having a dicyanobenzene structure in its molecular structure was precipitated as a crystal at a low temperature even with a mixing ratio of respective liquid crystal components where the liquid crystal state should be kept stable.

Such a problem of the mutual solubility of the liquid crystal molecules in the preparation of the liquid crystal material is generally treated as a dissolution of an ideal solution, as indicated in Y. Tanaka and S. Naemura: IDW '97 Proceedings p. 41–p. 44. In the preparation of the liquid crystal material, a study has been conducted in which additives are added to a mother compound to form an eutectic compound, a melting point of the liquid crystal (corresponding to the eutectic compound in the equation 1) is estimated by the following equation 1, and a liquid crystal having desired characteristics is prepared with consideration being given to the fact that precipitation of the liquid crystal component at a low temperature must be suppressed.

$$T = \Delta H_0 / ((\Delta H_0 / T_0) - R \cdot \ln X) \qquad \text{(equation 1)}$$

where,

T is the melting point of the eutectic compound, $\Delta H_o$ is the enthalpy of fusion of the mother compound, $T_0$ is the melting point of the mother compound, R is the gas constant, X is the mole fraction of the mother compound.

However, in accordance with a study of the present invention to solve the above problem, the following findings were obtained.

That is, it was determined that the interaction between molecules has not been considered sufficiently in the above conventional treating of the problem; and, the phenomena of dissolution and precipitation of the actual system were not sufficiently reproducible. If the interaction between the molecules is considered, the high polar liquid crystal molecule component, in particular, the liquid crystal molecule having the dicyanobenzene structure in its molecular structure is assumed to have smaller solubility to other low polar liquid crystals than that conceived in the conventional treatment; and, the above conception of the present invention is consistent with the phenomena of the actual system.

Accordingly, the liquid crystal molecule having a dicyanobenzene structure in its molecular structure can be dissolved in an amount smaller then the amount which is estimated as a problem of dissolution of an ideal solution at a similar temperature in the mixture with other low polar liquid crystal components in the actual liquid crystal system. Therefore, if the preparation of the liquid crystal is performed depending on the conventional melting point estimation, the stability at low temperature is worse than expected, precipitation of the liquid crystal components is generated at a higher temperature than expected, and the desired stability at low temperature can not be realized.

In accordance with the new treatment of mutual solubility of the liquid crystal components found in the course of the study of the present invention, the interaction between the liquid crystal components, which has not been considered in conventional treatment, is considered sufficiently. That is, a difference in the solubility parameters between the liquid crystal components is utilized in consideration of the interaction between the liquid crystal components, and the mutual solubility relating to the conventional treatment, that is, the melting point of the liquid crystal is corrected.

Practically, utilizing a calculating method for the solubility parameter disclosed in R. F. Fedors: Polym. Eng. Sci., 1974, Vol. 14, p 147, the solubility parameter of the liquid crystal molecule is calculated independently; the melting point of the liquid crystal, which is estimated by the conventional method, is corrected in a direction to increase the melting point by using a square of the difference of the solubility parameter of the liquid crystal components as a correcting term a; and the result can be made more approximate to the actual liquid crystal system than ever.

Actually, the melting point T' of the liquid crystal is calculated by the following equation 2:

$$T' = (\Delta H_0 + \alpha(1-X)^2)/(\Delta H_0/T_0) - R \cdot \ln X \quad \text{(equation 2)}$$

where,

T' is the melting point of the liquid crystal,

α is a proportional constant, $\Delta H_0$ is the enthalpy of fusion of the mother compound, $T_0$ is the melting point of the liquid crystal compound, which is the mother compound, R is the gas constant, X is the mole fraction of the mother compound.

As explained above, the accuracy in estimation of the mutual solubility of the actual liquid crystal system, in particular, in estimation of the stability at a low temperature, can be improved by considering the interaction between the molecules expressed as the difference in the solubility parameter, and the phenomena generated in the actual liquid crystal system can be readily reproduced.

Furthermore, a very useful finding could be obtained. That is, the influence of the interaction between the molecules on the mutual solubility of the liquid crystal was found. By considering the interaction between the molecules on the mutual solubility of the liquid crystal expressed as the difference in the solubility parameter, a guide line of new liquid crystal preparation for achieving an improvement of the stability at a low temperature of the liquid crystal was obtained.

Accordingly, it was found that the mutual solubility of the liquid crystal molecule having the dicyanobenzene structure in its molecular structure can be improved by including the liquid crystal molecular component, which makes the interaction with the liquid crystal molecule having the dicyanobenzene structure in its molecular structure weak (making the difference of the solubility parameter small), into the liquid crystal which becomes the mother liquid crystal.

In a case of dissolving the high polar single component of dicyanobenzene into the low polar mother liquid crystal, a larger amount of the high polar component can be dissolved at a low temperature by further including an intermediate polar single component between the high polar single component and the low polar mother liquid crystal in the mother liquid crystal.

Practically, for instance, since the liquid crystal expressed by the chemical formula 11 has a solubility parameter of 10.85, when the liquid crystal molecule having the dicyanobenzene structure in its molecular structure, of which the solubility parameter is in the range of 10.6–11.4, is dissolved into the low polar mother liquid crystal having a solubility parameter of approximately 8.0–9.2, a larger amount of the liquid crystal molecule having the dicyanobenzene structure in its molecular structure can be dissolved into the mother liquid crystal at low temperature by including the liquid crystal molecule having a solubility parameter in the range of 9.2–10.6 in the mother liquid crystal in comparison with the case when such a liquid crystal molecule is not contained therein.

As a result, the liquid crystal can have a larger negative dielectric anisotropy than ever, and a liquid crystal display device having a high performance can be provided, because the liquid crystal display device using the above liquid crystal material can be operated with a low driving voltage.

In this case, the amount of the liquid crystal molecule having a solubility parameter in the range of 9.2–10.6 to be contained in the mother liquid crystal is desirably at least 1% by weight and the utmost 70% by weight.

If the content is smaller than the above range, the effect to dissolve more of the liquid crystal molecule having the dicyanobenzene structure in its molecular structure is not sufficient. If the content is larger than the above range, the content of the other liquid crystal component is decreased, and the liquid crystal of high performance can not be prepared, because the width of selecting the liquid crystal becomes too narrow when the characteristics of the liquid crystal to be obtained are designed, so that there is a possibility that the performance of the liquid crystal display device can not be improved.

The liquid crystal molecule having a solubility parameter in the range of 9.2–10.6 is desirably a liquid crystal molecule having a negative dielectric anisotropy. As a result, when the liquid crystal has significant negative dielectric anisotropy, the liquid crystal display device using the liquid crystal can be operated with a low driving voltage, and the liquid crystal display device of high performance can be provided.

Practically, as the liquid crystal molecule having a solubility parameter in the range of 9.2–10.6, the liquid crystal molecule having a monocyanobenzene structure or a monocyanohexane structure is usable.

The liquid crystal molecule having a monocyanodioxane structure expressed by the chemical formula 5 is also usable.

(chemical formula 5)

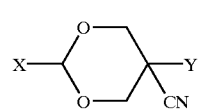

where, X and Y indicate atomic groups constituting other structure where, X and Y indicate atomic groups constituting other structure portions of the liquid crystal molecule.

Practically, the liquid crystal molecules expressed by the chemical formulas 12 and 13 are usable.

(chemical formula 12)

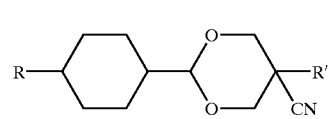

(chemical formula 13)

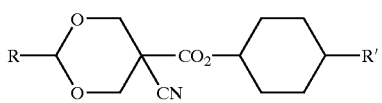

In the chemical formulas 12 and 13, R and R' indicate a straight chain alkyl group or a branched chain alkyl group.

Because the above liquid crystal molecules have a dioxane structure, the liquid crystal molecules have a relatively low viscosity among the liquid crystals having a cyano group. Accordingly, even if the compounds are contained in the liquid crystal, the viscosity of the liquid crystal is increased only slightly. In accordance with the IPS type liquid crystal display device, the response velocity of the liquid crystal is increased as the viscosity is decreased. Therefore, an increase in the viscosity of the using liquid crystal being used is desirably suppressed. Accordingly, use of the liquid crystal molecule having monocyanodioxane structure suppresses a decrease in the response velocity characteristics, and makes it possible to provide a liquid crystal display device which is operable with a low driving voltage.

The liquid crystal molecules having 2,3-difluoro-4-alkylphenyl structure (chemical formula 6), or 2,3-difluoro-4-alkoxyphenyl structure (chemical formula 7) can be used.

(chemical formula 6)

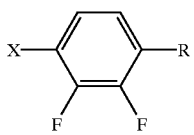

(chemical formula 7)

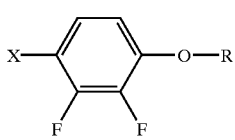

In chemical formulas 6 and 7,

X indicates an atomic group constituting other structure portion of the liquid crystal molecule, and R indicates straight chain or branched chain alkyl group, or alkyl substituted cycloalkyl group.

These liquid crystal molecules have a low viscosity, because a fluorine atom is contained in the molecular structure. Therefore, the viscosity of the liquid crystal is increased only slightly, even if these liquid crystal molecules are contained in the liquid crystal. Accordingly, use of these liquid crystal molecules suppresses a decrease in the response velocity, and makes it possible to provide a liquid crystal display device which is operable with a low driving voltage.

As practical examples of the liquid crystal molecules having 2,3-difluoro-4-alkylphenyl structure (chemical formula 6), or 2,3-difluoro-4-alkoxyphenyl structure (chemical formula 7), the liquid crystal molecules indicated by the following chemical formulas are usable.

(chemical formula 14)

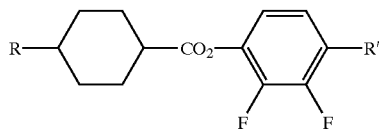

(chemical formula 15)

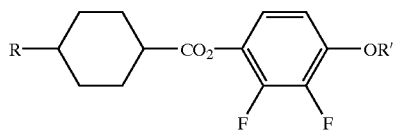

(chemical formula 16)

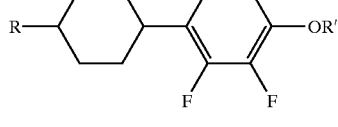

(chemical formula 17)

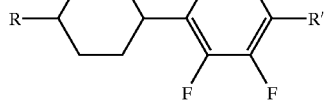

(chemical formula 18)

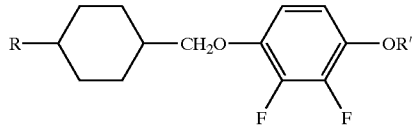

(chemical formula 19)

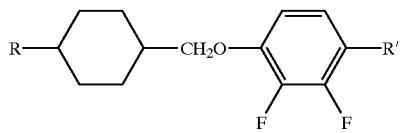

In chemical formulas from 14 to 19, R indicates a straight chain or branched chain alkyl group, or a alkyl substituted cycloalkyl group, and R' indicates a straight chain or branched chain alkyl group.

In liquid crystal material containing a liquid crystal molecule having a solubility parameter in the range of 9.2–10.6, the content of the liquid crystal molecule having a dicyanobenzene structure in its molecular structure is desirably in the range of at least 1% by weight to 30% by weight at the utmost.

If the content is smaller than the above range, the effect of increasing the dielectric anisotropy to the liquid crystal given by the liquid crystal molecule having a dicyanobenzene structure in its molecular structure is not sufficient, and the effect to increase the solubility of the liquid crystal molecule having a dicyanobenzene structure in its molecular structure by adding a liquid crystal molecule having a solubility parameter in the range of 9.2–10.6 is not realized sufficiently.

If the content is larger than the above range, the width of the temperature range indicating the condition of the liquid crystal becomes too narrow by elevating the melting point, even if the liquid crystal molecule having a solubility parameter in the range of 9.2–10.6 is contained therein, and a high performance liquid crystal display device, which is usable in a wide range of temperatures, can not be provided.

As explained above, the issue concerning the solubility of the liquid crystal molecule having a dicyanobenzene structure in its molecular structure could be solved by making the liquid crystal additionally contain a liquid crystal molecular component to decrease the intermolecular interaction between the liquid crystal molecules.

Next, the problem produced by a so-called residual image on the liquid crystal display device was resolved as follows.

The problem of a residual image on the liquid crystal display device refers to the failure of the display that is generated to be completely erased when the liquid crystal driving voltage waveform, wherein DC voltages are overlapped, is applied to the liquid crystal. For instance, in a case when letters and figures are displayed for a long time, there is a phenomenon wherein the displayed letters and figures continue to be displayed for a while after the display is erased. Although the residual image phenomenon will weaken gradually with time and finally disappear, sometimes it takes at least 30 minutes to disappear from view completely, so that it becomes a problem as a phenomenon which results in loss of the homogeneity of the display.

The overlap of the DC voltage in the liquid crystal driving waveform can not be avoided completely in a case wherein gradation driving is performed with the active driving type liquid crystal display device, and so it is possible that the problem of residual images will be generated with the IPS type liquid crystal display device.

In accordance with the liquid crystal display device which produces an execution state in accordance with the present invention, residual images have been generated sometimes, even though only for a short time and only slightly, when using a liquid crystal containing a liquid crystal molecule having monocyano structure and dicyano structure in its molecule.

The mechanism which causes the problem of residual images has not been clarified yet, and a measure to solve the problem has not been established. However, in a case where the liquid crystal driving waveform, wherein the DC voltages are overlapped, is applied to the liquid crystal, it has been assumed that the DC voltage (DC offset voltage) in the liquid crystal layer, which has remained after eliminating the DC voltage, might be a trigger of the phenomenon which produces the problem of residual images.

A model for explaining the mechanism whereby the DC offset voltage remains in the liquid crystal layer when a DC voltage is applied, along with the behavior of the ions in the liquid crystal layer, taking the conventional TN system as an example, has been proposed in Singaku Gihou EID 96-89, (1997–01) p. 29–34. In accordance with the proposed model, the DC voltage charged to the alignment film and the adsorption of ions to the alignment film can be assumed to be the source of the DC voltage which has remained in the liquid crystal layer.

And, it is concluded that the DC voltage remaining for several minutes is caused by the charge and relaxation of the alignment film, and the DC voltage remaining for a very much longer time than the above case is caused by adsorption of ions to the alignment film.

It is shown that the remaining DC voltage is determined by the total amount of electricity of the adsorbed ions, and it is suggested that the remaining DC voltage becomes larger as the amount of the ions in the liquid crystal layer is increased.

The alignment film, whereon the ions are adsorbed in the model of the above remaining DC voltage, is made of polyimide in a general active matrix type liquid crystal display device.

Accordingly, the problem of the DC voltage remaining for several minutes and the DC voltage remaining for a very long time can be solved effectively by decreasing the amount of ions in the liquid crystal layer and suppressing the charge on the alignment film and the adsorption of the ions to the alignment film. Therefore, it can be assumed that, by performing the countermeasures as indicated above, the DC offset voltage which is a trigger of the problem of residual images can be reduced, whereby the problem of residual images can be reduced.

Therefore, use of a liquid crystal material having a high resistance and less ions in the liquid crystal display device is desirable for reducing the residual images.

However, the liquid crystal display device, which produces an execution state in accordance with the present invention, uses a liquid crystal containing a liquid crystal molecule having a high polar cyano structure, in particular, a dicyano structure, in its molecular structure, and it is being difficult to make it highly resistant at a high level, such as by eliminating ions in the liquid crystal, as explained previously.

In the course of achieving the present invention, the following study was performed based on a new consideration of the above-described model, wherein a DC voltage remained in the liquid crystal layer based on the behavior of the ions.

That is, in accordance with the above-described model, the DC offset voltage, which is the source of the residual images, that is, the problem with the active matrix type liquid crystal display device including the IPS system, is caused by the charge on the alignment film and adsorption of the ions onto the alignment film. If the DC offset voltage is caused by the charge on the alignment film end adsorption of the ions onto the alignment film, and it is an objective to not generate the DC offset voltage, decreasing the total amount of the ions relating to the charge end the adsorption thereof is most desirable.

However, the problem is one of residual images generated by the DC offset voltage, and this problem of residual images can not be suppressed without suppressing the DC offset voltage.

That is, in an effort to rapidly effect relaxation after charging the alignment film, by making the adsorption of the ions difficult, or effecting dissociation rapidly even if the ions are adsorbed onto the alignment film, it can be assumed that the DC offset voltage and the failure involving a residual image caused by the DC offset voltage can be diminished rapidly to an invisible extent.

In accordance with the above consideration, various studies have been performed in an effort to rapidly effect relaxation after charging the alignment film, by making the ions in the liquid crystal difficult to be adsorbed, or reducing the residual images by making the dissociation rapidly even if the ions are adsorbed onto the alignment film.

First, an improvement of the alignment film made of polyimide, which was the body adsorbing the ions, was studied. Practically, the alignment film made of polyimide, on which the ions were adsorbed only with difficulty, was used as the alignment film. The alignment film made of a polyimide containing fluorine, which utilizes the characteristics of the fluorine atom on the ions, was used as the alignment film of the liquid crystal display devices producing the execution states to 3 relating to the present invention. As a result, it was revealed that the problem of residual images could be reduced, or generation of the problem could be suppressed.

As the fluorine containing type polyimide, any fluorine containing polyimide is usable, so long as the polyimide is composed in a manner such that the carbon atoms composing the main chain and branched chain of the polyimide are combined with a fluorine atom as a substituted group.

And, the polyimide is desirably durable in the temperature environment encountered during conventional manufacturing steps, being practically heat resistant to approximately 300° C.

Because the effect of introducing fluorine into the polyimide was confirmed, the surface of the alignment film made of polyimide which did not contain a fluorine atom was treated with a silane coupling agent containing fluorine so as to introduce fluorine atoms into the alignment film. The alignment film was used as the alignment film of the liquid crystal display devices producing the execution states 1 to 3 relating to the present invention. As a result, it was revealed similarly that the problem of residual images could be reduced, or generation of the problem could be suppressed.

Furthermore, the surface of the alignment film made of polyimide containing fluorine atoms was treated with a silane coupling agent containing fluorine so as to introduce more fluorine atoms into the alignment film. The alignment film was used as the alignment film of the liquid crystal display devices producing the execution states 1 to 3 relating to the present invention. As a result, it was revealed that the problem of residual images could be reduced further.

Then, improvement of the liquid crystal material was studied.

In accordance with the above consideration, the study for accelerating the relaxation of the charged alignment film was performed by reducing the specific resistance of the liquid crystal to a lower level, in order to perform the relaxation of the charge orientation rapidly.

Practically, the problem of residual images was studied in connection with the liquid crystal display device producing the first execution state according to the present invention by using liquid crystal material containing a liquid crystal molecule having a high polar cyano structure, in particular, a dicyano structure, in its molecular structure, of which the specific resistance was controlled. As result, it was revealed that, if the specific resistance of the liquid crystal was controlled in the range of at least $1.0 \times 10^{10}$ $\Omega$cm to, at the utmost, $9.9 \times 10^{11}$ $\Omega$cm, the problem of residual images could be reduced.

If the specific resistance of the liquid crystal is higher than $9.9 \times 10^{11}$ $\Omega$cm, the effect to reduce the problem of residual images could not be observed significantly, and if the specific resistance of the liquid crystal is lower than $1.0 \times 10^{10}$ $\Omega$cm, a high image quality could not be maintained.

The problem of residual images was studied on the liquid crystal display devices producing the first and second execution states according to the present invention by using a liquid crystal material containing the liquid crystal molecule having a high polar cyano structure, in particular, a dicyano structure, in its molecular structure, of which the specific resistance was controlled. As a result, it was revealed that, if the specific resistance of the liquid crystal was controlled in the range of at least $1.0 \times 10^9$ $\Omega$cm to, at the utmost, $9.9 \times 10^{11}$ $\Omega$cm, the problem of residual images could be reduced.

In particular, the effect to reduce the problem of residual images was significant by controlling the specific resistance of the liquid crystal in the range at least $1.0 \times 10^9$ $\Omega$cm to utmost $9.9 \times 10^{10}$ $\Omega$cm.

If the specific resistance of the liquid crystal is higher than $9.9 \times 10^{11}$ $\Omega$cm, the effect to reduce the problem of residual images could not be observed, and if the specific resistance of the liquid crystal is lower then $1.0 \times 10^{10}$ $\Omega$cm, a high image quality could not be maintained.

As the method for controlling the specific resistance of the liquid crystal containing a liquid crystal molecule having a high polar cyano structure, in particular, a dicyano structure, in its molecular structure in the above range, a method to irradiate ultraviolet rays onto the liquid crystal is simple and desirable.

Furthermore, during the manufacturing of the liquid crystal display device, a method comprising the steps of interposing the liquid crystal material containing the liquid crystal molecule having a high polar cyano structure, in particular, a dicyano structure in its molecular structure between a pair of substrates, and irradiating ultraviolet rays onto the liquid crystal through the substrate to control the specific resistance of the liquid crystal before providing the polarizer, serving as an optical means, on the substrate is desirable, because the method facilitates the manufacture of the liquid crystal display devices which produce the first to third execution states according to the present invention.

When the pair of substrates are not made of quartz, but are made of glass, as substrates for a normal liquid crystal display device, use of a low voltage mercury lamp for irradiating ultraviolet rays is not adequate, because the ultraviolet rays will hardly reach the liquid crystal, so that use of another light source having wider emission spectrum characteristics is desirable. In particular, use of a high voltage mercury lamp is desirable, because it can be handled readily.

When the liquid crystal display device is provided with color filters, the irradiation of ultraviolet rays is desirably performed at a close which makes the specific resistance of the liquid crystal such a value in the desired range, but not to cause discoloration of the color filters. 15 A liquid crystal display device, which represents an embodiment of the present invention will be explained hereinafter.

EMBODIMENT 1

A first practical embodiment of the liquid crystal display device for producing the first execution state in accordance with the present invention, will be explained with reference to FIG. 1, FIG. 2, FIG. 6 and FIG. 7.

In manufacturing the liquid crystal display device 50, i.e. the first embodiment of the present invention, a glass plate, which is 0.7 mm thick and the surface of which is polished, is used as the substrate 1. The TFT substrate 51 is manufactured by forming an insulating film, for insulating the electrodes 2, 5, 6, and 17, a thin film transistor 16, and a protective insulation film 7, for protecting the thin film transistor 16 and the electrodes 5, 6, on the substrate 1.

FIG. 2 indicates the structure of the thin film transistor 16 and the electrodes 2, 5 and 6. FIG. 2 is a plan view, FIG. 2A is a cross section taken along the line A–A', and FIG. 2B is a cross section taken along the line B–B'. FIG. 1is a cross section taken along the line C–C' in FIG. 2.

The thin film transistor 16 is composed of pixel electrode 5, signal electrode 6, scanning electrode 17, and amorphous silicon 18. The common electrode 2 and the scanning electrode 17 are formed by patterning an aluminum film, and the signal electrode 6 and the pixel electrode 5 are formed by patterning a chromium film.

A chromium film, which is low resistant and can be patterned readily, was used for common electrode 2 and the pixel electrode 5, but higher bright characteristics can be achieved by forming transparent electrodes using an ITO film.

The insulating film 4 and the protective insulation film 7 were made of silicon nitride, and the thicknesses of these films were, respectively, 0.2 $\mu$m and 0.8 $\mu$m. The capacitor element 19 is formed in the area combined between two pixel electrodes 5 with a structure in which the insulating film 4 is interposed between the pixel electrode 5 and the common electrode 2. The pixel electrode 5 is arranged among the three legs of common electrode 2 in FIG. 2. The number of pixels is 1024×3×768 composed of 1024×3 (corresponding to R, G, B) signal electrodes 6 and 768 scanning electrodes 17.

Next, conventional alignment film 8 made of polyimide, which does not contain fluorine, is formed on the TFT substrate 51 with a film thickness of 80 nm, and its surface is treated by rubbing treatment for orientating the liquid crystal.

Figure 7:
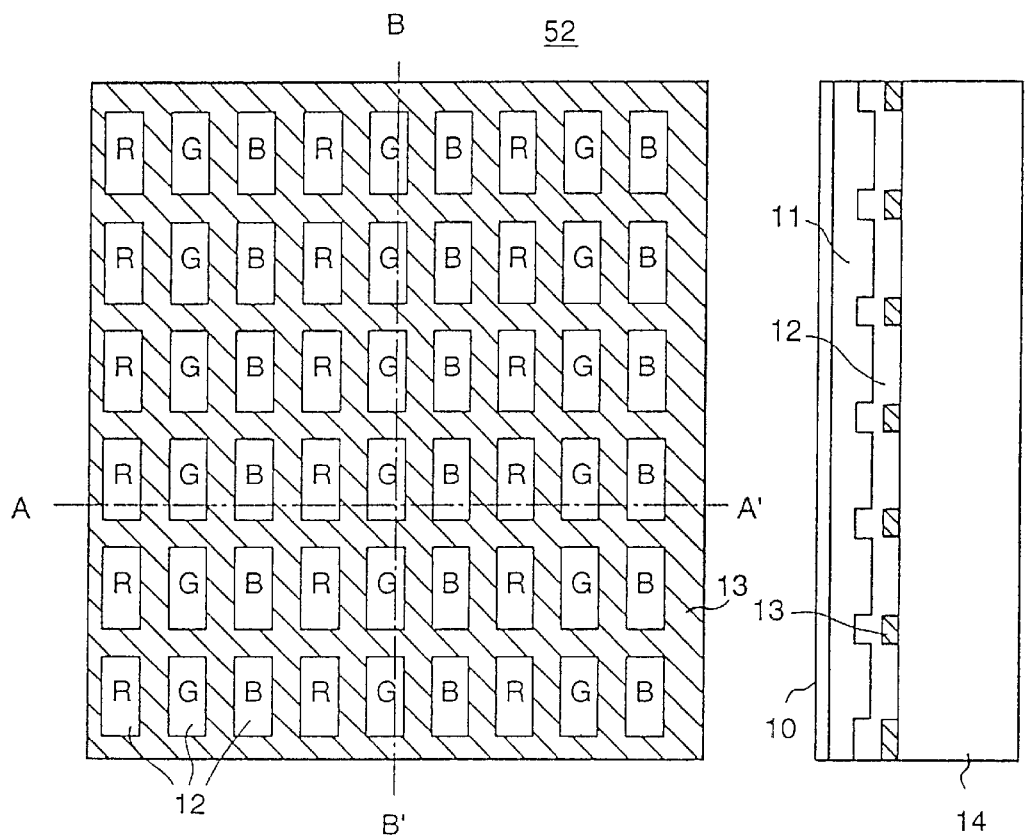
FIG. 7 is a schematic plan view of a color filter substrate for a liquid crystal display device according to the present invention.
Figure 7B:
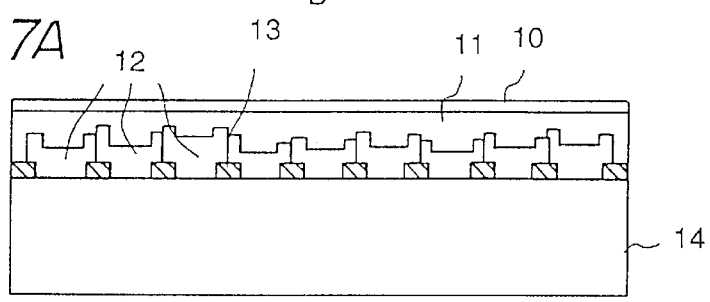
FIG. 7B is a schematic cross-section taken along line B–B' in FIG. 7.

The color filter 12 combined with a black matrix is formed on the substrate 14 to form the counter color filter substrate 52. FIG. 7 is an illustration of the structure of the color filter substrate in the liquid crystal display device of the first embodiment of the present invention. FIG. 7 is a plan view of the color filter substrate, FIG. 7 is a transverse cross section taken along the line A–A' line in FIG. 7, and FIG. 7B is a transverse cross section taken along the line B–B' in FIG. 7. The lattice black matrix 13, the color filters 12 composed of the three colors R, G, B, and the color film protective film 11 are formed on the substrate 14. On the color filter protective film 11, an alignment film 10 is formed with a film thickness of 80 nm, and an alignment film is formed as well as on the TFT substrate 1. Rubbing treatment is then performed on the alignment films 8, 10. The directions of rubbing on the alignment film 8, 10 on the TFT substrate 51 and the color filter substrate 52 were approximately parallel to each other, and the angle formed with the direction of the applied electric field 25 was 15 degrees. Polymer beads that were 3 μm in average diameter were dispersed as spacers between these substrates, and the liquid crystal material 9 was interposed between the TFT substrate 51 and the color filter substrate 52.

The liquid crystal material 9 consisted of a material containing a liquid crystal molecule having a cyano structure expressed by the chemical formula 11 in its molecular structure by 9% by weight, and its dielectric anisotropy was −2.2, and Δn was 0.1.

The two polarizers 15 on the outer surfaces of the TFT substrate 51 and the color filter substrate 52 were arranged in a cross-nicole manner. In accordance with the liquid crystal display device 50, i.e. the first embodiment of the present invention, normally-close characteristics, which provided a dark-state at low voltage and a bright-state at high voltage, were adopted.

Figure 8:
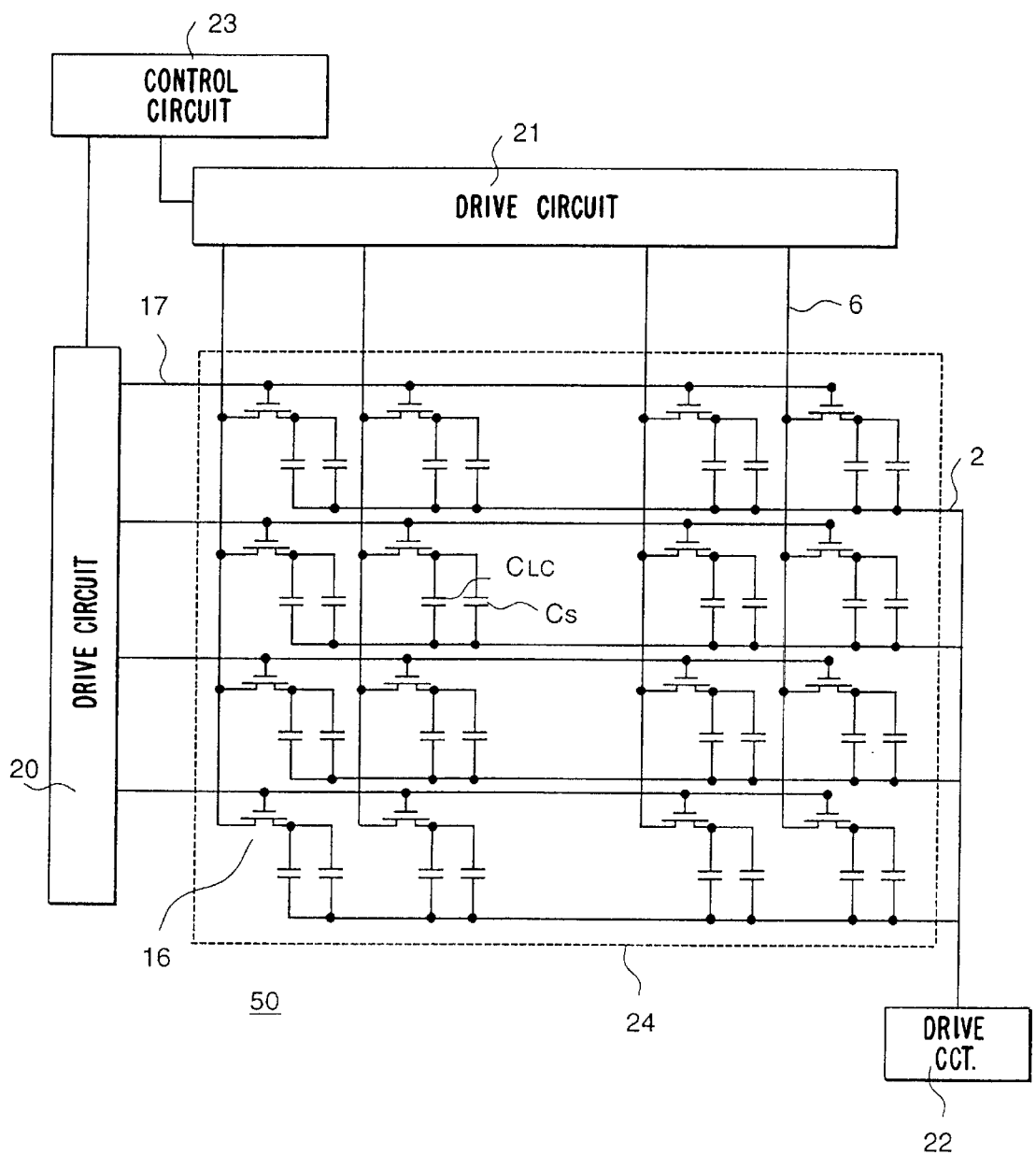
FIG. 8 is a system block diagram of the driving system of the liquid crystal display device according to the present invention.

FIG. 8 is a system diagram for explaining the driving system of the liquid crystal display device, which represents the first embodiment of the present invention. The liquid crystal display device 50 was connected with a driving LSI, as indicated in FIG. 8. The driving circuit 20 for scanning electrodes 17, the driving circuit 21 for signal electrodes 6, and the driving circuit 22 for common electrodes 2 were connected on the TFT substrate 51; and, active matrix driving was performed by supplying a scanning signal voltage, an image signal voltage, and a timing signal from a power supply circuit and the control circuit 23. In FIG. 8, the manner in which the liquid crystal ($C_{LC}$) and the capacitor element ($C_S$) are connected as a load of the thin film transistor 16 is indicated for each respective one of the pixels.

The image quality of the liquid crystal display device, which represents the first embodiment of the present invention, was evaluated. As a result, a high quality display were confirmed, and a wide viewing angle at an intermediate tone display was confirmed. A slight problem of residual images was also observed.

EMBODIMENT 2

The second embodiment of the liquid crystal display device of the present invention is composed in the same was as the first embodiment, except that the liquid crystal material being used is different. Accordingly, details of the composition of the display device will be omitted.

The liquid crystal material used in the liquid crystal display device of the second embodiment is a material containing low polar liquid crystal molecules indicated as chemical formulas 20 to 22, and the liquid crystal material is composed by dissolving the liquid crystal molecule indicated by the chemical formula 11 into the liquid crystal having a solubility parameter of 9.15.

(chemical formula 20)
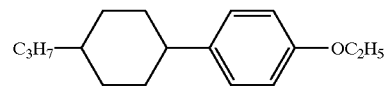

(chemical formula 21)
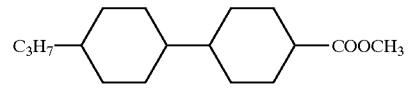

(chemical formula 22)
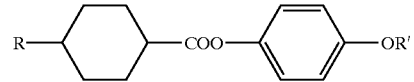

In these chemical formulas, R indicates a straight chain alkyl of $C_4$ or $C_5$, R' indicates a straight chain alkyl of $C_1$ or $C_2$.

The content of the liquid crystal material expressed by chemical formula 11 was estimated such that 20% by weight was soluble at 20° C. by the conventional method, described previously, which handled the problem as a problem of solubility of an ideal solution. However, if the liquid crystal was prepared actually, the liquid crystal molecule expressed by the chemical formula 11 was precipitated. Finally, it was found that only 9% by weight was soluble into the liquid crystal having the solubility parameter of 9.15, solely. Then, the liquid crystal molecule expressed by the following chemical formula 23, which had a small intermolecular interaction with the liquid crystal molecule expressed by the chemical formula 11, the solubility parameter of 10.0, and negative dielectric anisotropy, was added by 10%. As a result, the liquid crystal molecule expressed by the chemical formula 11 could be dissolved at 11% by weight.

(chemical formula 23)
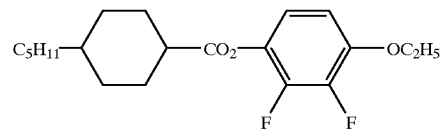

Accordingly, the actual content of the liquid crystal expressed by chemical formula 11 was 11% by weight, and the dielectric anisotropy of the liquid crystal was −3.2.

The liquid crystal display device of the second embodiment of the present invention could be operated with a lower driving voltage in comparison with the liquid crystal display device of the first embodiment of the present invention. A high quality display and a wide viewing angle at an intermediate tone display were confirmed by evaluation of the liquid crystal display device of the second embodiment of the present invention.

EMBODIMENT 3

The third embodiment of the liquid crystal display device of the present invention is composed as same as the first embodiment, the only difference that the alignment film used is made of polyimide containing fluorine. Accordingly, details of the composition of the display device will be omitted.

A high quality display and a wide viewing angle at an intermediate tone display were confirmed by operation of the liquid crystal display device of the third embodiment of the present invention. The problem of residual images was diminished rapidly, and its reduction was confirmed in comparison with the liquid crystal display device of the first embodiment of the present invention.

Next, the same evaluation was performed using liquid crystals of low specific resistance, which were controlled as $2.0 \times 10^{11}$ Ωcm and $9.0 \times 10^{10}$ Ωcm, respectively. As a result, the problem of residual image was hardly observed in both cases, and its reduction was confirmed.

EMBODIMENT 4

Hereinafter, the fourth embodiment, which is the practical composition of the liquid crystal display device for producing the second execution state in accordance with the present invention, will be explained with reference to FIG. 3 and FIG. 4.

In manufacturing the liquid crystal display device 150, i.e. the fourth embodiment of the present invention, a glass substrate, which is 0.7 mm thick and the surface of which is polished, is used as the substrate 11. The TFT substrate 151 is manufactured by forming the insulating film 104, for insulating the electrodes 102, 105, 106, and 117, thin film transistor 116, and protective insulation film 107 for protecting the thin film transistor 116, and the electrodes 105, 106, on the substrate 101.

Figure 4A:
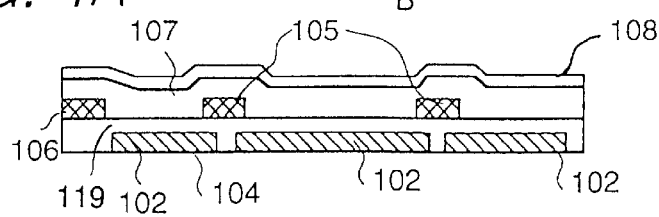
FIG. 4A is a section view taken along line A–A' in FIG. 4.

FIG. 4 indicates the structure of the thin film transistor 116 end the electrodes 102, 105, 106. FIG. 4 is a plan view, FIG. 4A is a cross section taken along the line A–A', and FIG. 4B is a cross section taken along the line B–B'. FIG. 3 is a cross section taken along the line C–C' in FIG. 4.

The thin film transistor 116 is composed of pixel electrode 105, signal electrode 106, scanning electrode 117, and amorphous silicon 118. The scanning electrode 117 is formed by patterning an aluminum film, the signal electrode 106 is formed by patterning a chromium film, and the common electrode 102 and the pixel electrode 105 are formed by patterning ITO.

The insulating film 104 and the protective insulation film 107 were made of silicon nitride, and thicknesses of these films were, respectively 0.2 μm and 0.8 μm. The capacitor element 119 is formed in the area combined between two pixel electrodes 105 and the opening area with a structure in which the insulating film 104 is interposed between the pixel electrode 105 and the common electrode 102. The pixel electrode 105 is arranged among the three common electrode 102, as seen in FIG. 4. In accordance with the present embodiment three common electrodes are used. However, the number of the common electrodes at the comb teeth portion is increased by narrowing the intervals between the pixel electrodes at the teeth portion, and the number of the common electrodes can be increased corresponding to the number of the pixel electrodes. The number of pixels is 1024×3×768 composed of 1024×3 (corresponding to R, G, B) signal electrodes 106 and 768 scanning electrodes 117.

Next, a conventional alignment film 108 made of polyimide, which does not contain fluorine, is formed on the TFT substrate 151 with a film thickness of 80 nm, and its surface is treated by rubbing treatment for orientating the liquid crystal.

The color filter 112 combined with a black matrix 113, the composition of which is the same as that of the liquid crystal display device 50 of the first embodiment of the present invention, was formed on the substrate 114 to form the counter color filter substrate 152. The alignment film 110, which is the same as that on the TFT substrate 101, was formed on the color filter protective film 111 so as to be 80 nm in thickness, and rubbing treatment was performed thereon.

The direction of rubbing of the alignment film 108, 110 on the TFT substrate 151 and the color filter substrate 152 were approximately parallel to each other, and the angle formed with the direction of the applied electric field 125 was 15 degrees. Polymer beads which were 3 μm in average diameter were dispersed as spacers between these substrates, and the liquid crystal material 109 was interposed between the TFT substrate 151 and the color filter substrate 152.

The liquid crystal material 109 was a material containing a liquid crystal molecule having a cyano structure expressed by the chemical formula 11 in its molecular structure by 9% by weight, and its dielectric anisotropy was −2.2, and Δn was 0.1.

The two polarizers 115 on the outer surfaces of the TFT substrate 151 and the color filter substrate 152 were arranged in a cross-nicole manner. In accordance with the liquid crystal display device 150, i.e. the fourth embodiment of the present invention, normally-close characteristics, which provided a dark-state at low voltage and a bright-state at high voltage, were adopted.

Because the composition of the driving system of the liquid crystal display device of the fourth embodiment of the present invention is the same as that of the first embodiment, details of the composition of the driving system will be omitted.

A high quality display and a wide viewing angle at an intermediate tone display were confirmed by evaluation of the image quality of the liquid crystal display device of the fourth embodiment of the present invention. The problem of residual images could be observed slightly, as with the first embodiment.

EMBODIMENT 5

The fifth embodiment of the liquid crystal display device of the present invention is the same as the first embodiment, except that the liquid crystal being used was different from that of the first embodiment. Accordingly, details of the composition of the display device will be omitted.

The liquid crystal used for the liquid crystal display device of the fifth embodiment was the same as that used in the second embodiment of the present invention.

The liquid crystal display device of the fifth embodiment could be operated by a lower driving voltage in comparison with the fourth embodiment of the present invention, and a high quality display and a wide viewing angle at an intermediate tone display were confirmed by operation of the liquid crystal display device of the fifth embodiment of the present invention.

EMBODIMENT 6

The sixth embodiment of the liquid crystal display device of the present invention is the same as the fourth embodiment, the only difference being that the alignment film used is made of a polyimide containing fluorine. Accordingly, details of the composition of the display device will be omitted.

A high quality display and a wide viewing angle at an intermediate tone display were confirmed by operation of the liquid crystal display device of the sixth embodiment of the present invention. The problem of residual images was diminished rapidly, and its reduction was confirmed in comparison with the liquid crystal display device of the fourth embodiment of the present invention.

Next, the same evaluation was performed using liquid crystals of low specific resistance, which were controlled as $2.0 \times 10^{11}$ Ωcm and $9.0 \times 10^{10}$ Ωcm, respectively. As a result, the problem of residual image was hardly observed in either case, and its reduction was confirmed.

EMBODIMENT 7

Hereinafter, the seventh embodiment, which represents a practical example of a liquid crystal display device for producing the third execution state of the present invention, will be explained with reference to FIG. 5 and FIG. 6.

In manufacturing the liquid crystal display device 250, i.e. the seventh embodiment of the present invention, a glass substrate, which is 0.7 mm thick and the surface of which is polished, is used as the substrate 201. The TFT substrate 251 is manufactured by forming the insulating film 204, for insulating the electrodes 202, 205, 206, and 217, thin film transistor 216, and protective insulation film 207 for protecting the thin film transistor 216, and the electrodes 205, 206, on the substrate 201.

FIG. 6 indicates the structure of the thin film transistor 216 and the electrodes 202, 205, 206. The thin film transistor 216 is composed of pixel electrode 205, signal electrode 206, scanning electrode 217, and amorphous silicon 218. The scanning electrode 217 is formed by patterning an aluminum film, the signal electrode 206 is formed by patterning a chromium film, and the common electrode 202 and the pixel electrode 205 are formed by patterning ITO.

The insulating film 204 and the protective insulation film 207 were made of silicon nitride, and the thicknesses of the films were respectively, 0.2 μm and 0.8 μm. The capacitor element 226 is formed in a structure in which the insulating films 204, 207 are interposed between the pixel electrode 205 and the common electrode 202. The pixel electrode 205 is arranged on the flat common electrode 202 in an overlapping manner. The number of pixels is 1024×3×768 composed of 1024×3 (corresponding to R, G, B) signal electrodes 206 and 768 scanning electrodes 217.

Next, a conventional alignment film 208 made of polyimide, which does not contain fluorine, is formed on the TFT substrate 251 with a film thickness of 80 nm, and its surface is treated by rubbing treatment for orientating the liquid crystal.

The color filter 212 combined with a black matrix 213, the composition of which is the same as that of the liquid crystal display device 50 of the first embodiment of the present invention, was formed on the substrate 214 to form the counter color filter substrate 252. The alignment film 210, which is the same as that on the TFT substrate 201, was formed on the color filter protective film 211 to be 80 nm in thickness, and rubbing treatment was performed thereon.

The directions of rubbing on the alignment films 208, 210 on the TFT substrate 251 and the color filter substrate 252 were approximately parallel to each other, and the angle formed with the direction of the applied electric field 225 was 15 degrees. Polymer beads which were 3 μm in average diameter were dispersed as spacers between these substrates, and the liquid crystal material 209 was interposed between the TFT substrate 251 and the color filter substrate 252.

The liquid crystal material 209 was a material containing a liquid crystal molecule having a cyano structure expressed by the chemical formula 11 in its molecular structure by 9% by weight, and its dielectric anisotropy was −2.2, and Δn was 0.1.

The two polarizers 215 on the outer surfaces of the TFT substrate 251 and the color filter substrate 252 were arranged in a cross-nicole manner. In accordance with the liquid crystal display device 250, i.e. the seventh embodiment of the present invention, normally-close characteristics, which produced a dark-state at low voltage and a bright-state at high voltage, were adopted.

Because the composition of driving system of the liquid crystal display device of the seventh embodiment of the present invention is the same as that of the first embodiment, details of the composition of the drawing system will be omitted.

A high quality display and a wide viewing angle at an intermediate tone display were confirmed by evaluation of the image quality of the liquid crystal display device of the seventh embodiment of the present invention. The problem of residual images could be observed slightly, as with the first embodiment.

EMBODIMENT 8

The eighth embodiment of the liquid crystal display device of the present invention is the as same as the seventh embodiment, except that the liquid crystal being used was different from that of the seventh embodiment. Accordingly, details of the composition of the display device will be omitted.

The liquid crystal used for the liquid crystal display device of the eighth embodiment was the same as that used in the second embodiment of the present invention.

The liquid crystal display device of the eighth embodiment could be operated by a low driving voltage, and a high qualify display and a wide viewing angle at an intermediate tone display were confirmed by operation of the liquid crystal display device of the eighth embodiment of the present invention.

EMBODIMENT 9

The ninth embodiment of the liquid crystal display device of the present invention is the same as the seventh embodiment, the only difference being that the alignment film used is made of a polyimide containing fluorine. Accordingly, details of the composition of the display device will be omitted.

A high quality display and a wide viewing angle at an intermediate tone display were confirmed by operation of the liquid crystal display device of the ninth embodiment of the present invention. The problem of residual images was diminished rapidly, and its reduction was confirmed in comparison with the liquid crystal display device of the seventh embodiment of the present invention.

Next, the same evaluation was performed using the liquid crystals of low specific resistance, which were controlled as $2.0 \times 10^{11}$ Ωcm and $9.0 \times 10^{10}$ Ωcm, respectively. As a result, the problem of residual image was hardly observed in either case, and its reduction was confirmed.

In accordance with the invention, a liquid crystal display device, which is capable of realizing a wide viewing angle at an intermediate tone display, and of making a low voltage driving compatible with a high quality display by achieving a high contrast ratio, can be provided.

In accordance with the invention, a liquid crystal display device which makes it possible to use a switching element having superior operation characteristics, and is capable of realizing a wide viewing angle at an intermediate tone display, and of making a low voltage driving compatible with a high quality display, can be provided.

In accordance with the invention, a liquid crystal display device, which is capable of realizing a wide viewing angle at an intermediate tone display, while making a low voltage driving compatible with a high quality display, and which reduces the problem of residual images, can be provided.

In accordance with the invention, a liquid crystal display device, which is capable of realizing a wide viewing angle at an intermediate tone display, while making low voltage driving compatible with the high quality display, and having a high reliability, can be provided.

What is claimed is:

1. A liquid crystal display device, comprising:
    a pair of substrates;
    a liquid crystal layer interposed between said pair of substrate; and
    a pixel electrode, a common electrode, and an active element arranged on at least one of said pair of substrates;
    in which images are disposed by controlling liquid crystal in the liquid crystal layer by applying a voltage between the pixel electrode and the common electrode; wherein
        said liquid crystal layer comprises liquid crystal molecules, having dicyanobenzene structure, with a solubility parameter in a range of 10.6 to 11.4; liquid crystal molecules having a solubility parameter in a range of 9.2 to 10.6; and liquid crystal molecules having a solubility parameter in a range from 8.0 to 9.2, therein; and
        said liquid crystal layer has a negative dielectric anisotropy by containing a liquid crystal molecule having dicyanobenzene structure in its molecular structure.
2. A liquid crystal display device as claimed in claim 1, wherein
    said active element is a thin film transistor.
3. A liquid crystal display device as claimed in any one of claim 1 and claim 2, wherein
    at least one of said pixel electrode and said common electrode is composed of a transparent electrode.
4. A liquid crystal display device as claimed in claim 3, wherein
    said transparent electrode is made of an indium-tin-oxide (ITO) film.
5. A liquid crystal display device as claimed in any one of claims 1 and 4, wherein
    a liquid crystal alignment film composed of polyimide containing fluorine is provided on the plane, which contacts with said liquid crystal layer, of said pair of substrates.
6. A liquid crystal display device as claimed in any one of claims 1 and 4, wherein
    a liquid crystal alignment film composed of polyimide, the surface of which is treated with a silane coupling agent containing fluorine, is provided on the plane, which contacts with said liquid crystal layer, of said pair of substrates.
7. A liquid crystal display device as claimed in any one of claims 1 and 4, wherein
    the liquid crystal in said liquid crystal layer has a specific resistance in the range of $1.0 \times 10^{10}$ Ωcm to $9.9 \times 10^{11}$ Ωcm.
8. A liquid crystal display device as claimed in claim 1, wherein
    said liquid crystal molecules having the solubility parameter in the range from 9.2 to 10.6 is included in the liquid crystal layer in a concentration in a range from 1% by weight to 70% by weight.
9. A liquid crystal display device as claimed in claim 8, wherein
    said liquid crystal layer is composed of a liquid crystal containing said liquid crystal molecule having a dicyanobenzene structure in its molecule structure by a concentration in the range from 1% by weight to 30% by weight.
10. A liquid crystal display device as claimed in claim 1, wherein
    said liquid crystal molecules having the dicyanobenzene structure is selected from the group consisting of liquid crystal molecules expressed by the following chemical formulas 2 to 4:

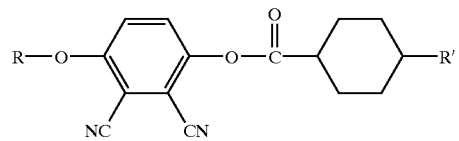

(chemical formula 2)

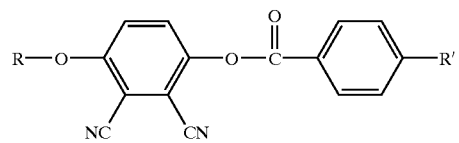

(chemical formula 3)

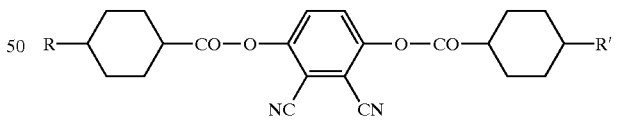

(chemical formula 4)

in these chemical formulas 2 to 4, R expresses straight chain alkyl group, branched chain alkyl group, or alkyl substituted cycloalkyl group, R' expresses straight chain or branched chain alkyl group, straight chain or branched chain alkoxy group, or alkyl substituted cycloalkyl group.

11. A liquid crystal display device as claimed in claim 10, wherein
    said liquid crystal molecules having the solubility parameter in the range from 9.2 to 10.6 are liquid crystal molecules having at least one of a monocyanobenzene structure and a monocyanocyclohexane structure in its molecular structure.

12. A liquid crystal display device as claimed in claim 10, wherein said liquid crystal molecules having a solubility parameter in the range from 9.2 to 10.6 are liquid crystal molecules expressed by the following chemical formulas 12 or 13:

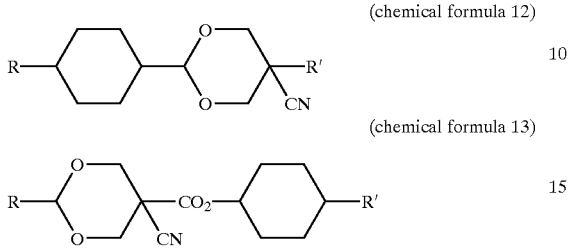

(chemical formula 12)

(chemical formula 13)

where R and R' express straight chain alkyl group or branched chain alkyl group.

13. A liquid crystal display device as claimed in claim 10, wherein said liquid crystal molecules having a solubility parameter in the range from 9.2 to 10.6 are at least liquid crystal molecules selected from the group consisting of the liquid crystal molecule expressed by any one of the following chemical formulas 14, 15, 16, 17, 18, and 19:

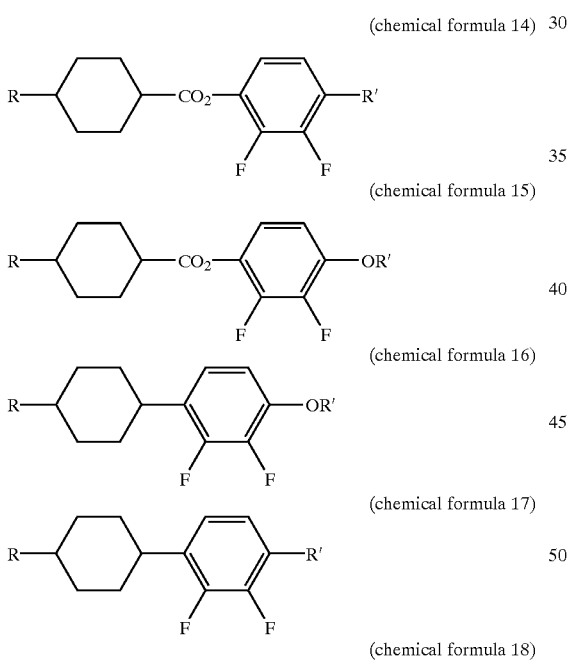

(chemical formula 14)

(chemical formula 15)

(chemical formula 16)

(chemical formula 17)

(chemical formula 18)

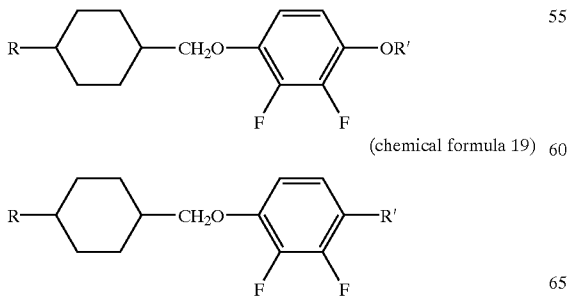

(chemical formula 19)

where R expresses a straight chain or branched chain alkyl group or alkyl substituted cycloalkyl group, and R' expresses a straight chain or branched chain alkyl group.

14. A liquid crystal display device, comprising:
a pair of substrates;
a liquid crystal layer interposed between said pair of substrates; and
a pixel electrode, a common electrode, and an active element arranged on at least one of said pair of substrates;
in which images are displayed by controlling liquid crystal in the liquid crystal layer by applying a voltage between the pixel electrode and the common electrode; wherein
said liquid crystal layer has a negative dielectric anisotropy by containing a liquid crystal molecule having a cyano structure in its molecular structure,
at least a part of said pixel electrode and said common electrode are overlapped with each other to form an additive capacitor at an opening portion inside a pixel, and
at least one of said pixel electrode and said common electrode is composed of transparent conductive film.

15. A liquid crystal display device as claimed in claim 14, wherein said liquid crystal contains a liquid crystal molecule having a negative dielectric anisotropy by having a dicyanobenzene structure in its molecule structure.

16. A liquid crystal display device as claimed in claim 15, wherein a liquid crystal alignment film composed of a polyimide containing fluorine is provided on the a plane, which contacts said liquid crystal layer, of said pair of substrates.

17. A liquid crystal display device as claimed in claim 15, wherein a liquid crystal alignment film composed of a polyimide, the surface of which is treated with a silan coupling agent containing fluorine, is provided on a plane, which contacts said liquid crystal layer, of said pair of substrates.

18. A liquid crystal display device as claimed in claim 14, wherein the liquid crystal in said liquid crystal layer has a specific resistance in the range of $1.0\times10^{10}$ Ωcm to $9.9\times10^{11}$ Ωcm.

19. A liquid crystal display device as claimed in claim 18, wherein the liquid crystal in said liquid crystal layer has a specific resistance in the range of $1.0\times10^{10}$ Ωcm to $9.9\times10^{11}$ Ωcm.

20. A method of manufacturing the liquid crystal display device as claimed in any one of claim 18 and claim 19, which comprises a step of:

irradiating the liquid crystal interposed between a pair of substrates with ultraviolet rays.

21. A liquid crystal display device as claimed in claim 14, wherein said insulating film interposed between said pixel electrode and said common electrode is made of a material selected from the group consisting of silicon nitride, titanium oxide, and silicon oxide.

22. A liquid crystal display device as claimed in any one of claims 14 and 21, wherein said liquid crystal molecules having a cyano structure contained in said liquid crystal layer are liquid crystal molecules having a dicyanobenzene structure in the molecule.

23. A liquid crystal display device as claimed in claim 22, wherein said liquid crystal molecules having a dicyanobenzene structure is at least one of liquid crystal molecules selected from the group consisting of the liquid crystal expressed by the following chemical formulas 2 to 4:

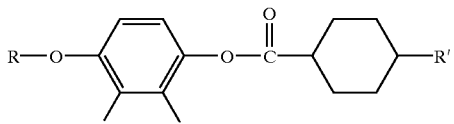
(chemical formula 2)

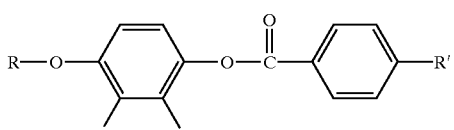
(chemical formula 3)

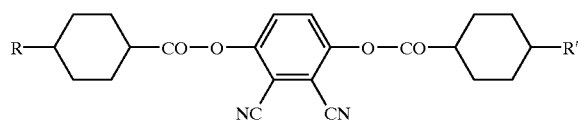
(chemical formula 4)

where R expresses any one of straight chain alkyl group and alkyl substituted cycloalkyl group, R' expresses any one of straight chain or branched chain alkyl group, straight chain or branched chain alkoxy group, and alkyl substituted cycloalkyl group.

24. A liquid crystal display device as claimed in claim 23, wherein said liquid crystal layer has a negative dielectric anisotropy by containing liquid crystal molecules containing a dicyanobenzene structure in its molecule having a solubility parameter value in the range from 10.6 to 11.4, liquid crystal molecules having a solubility parameter value in the range from 9.2 to 10.6, and liquid crystal molecules having a solubility parameter value in the range from 8.0 to 9.2.

25. A liquid crystal display device as claimed in claim 24, wherein said liquid crystal layer is composed of a liquid crystal containing said liquid crystal molecules having a dicyanobenzene structure in its molecular structure by a concentration in the range from 1% by weight to 30% by weight.

26. A liquid crystal display device as claimed in claim 24, wherein said liquid crystal layer is composed of liquid crystals containing liquid crystal molecules having a solubility parameter in the range from 9.2 to 10.6 in a concentration in a range from 1% by weight to 70% by weight.

27. A liquid crystal display device as claimed in claim 24, wherein said liquid crystal molecules having a solubility parameter in the range from 9.2 to 10.6 are liquid crystal molecules expressed by the following chemical formulas 12 or 13:

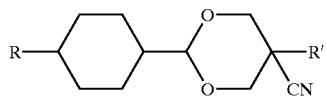
(chemical formula 12)

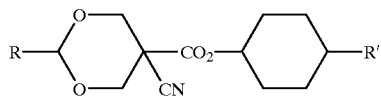
(chemical formula 13)

where R and R' express straight chain alkyl group or branched chain alkyl group.

28. A liquid crystal display device as claimed in claim 24, wherein said liquid crystal molecules having a solubility parameter in the range from 9.2 to 10.6 are at least liquid crystal molecules selected from the group consisting of the liquid crystal molecules expressed by any one of the following chemical formulas 14, 15, 16, 17, 18, and 19:

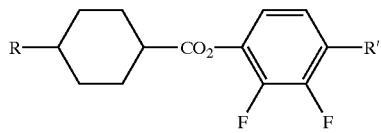
(chemical formula 14)

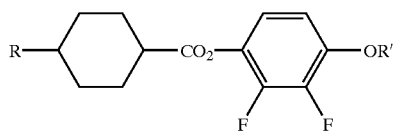
(chemical formula 15)

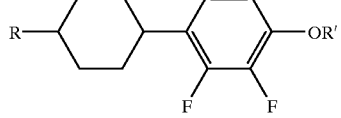
(chemical formula 16)

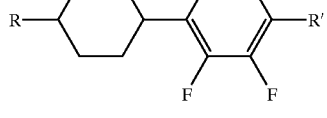
(chemical formula 17)

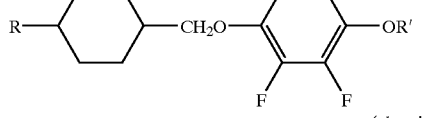
(chemical formula 18)

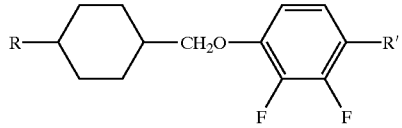
(chemical formula 19)

where R expresses a straight chain or branched chain alkyl group or alkyl substituted cycloalkyl group, and R' expresses a straight chain or branched chain alkyl group.

29. A liquid crystal display device as claimed in claim 24, wherein said liquid crystal molecules having a solubility parameter in the range from 9.2 to 10.6 are liquid crystal molecules having at least one of monocyanobenzene structure and monocyanocyclobenzene structure in their molecular structure.

30. A liquid crystal display device as claimed in claim 14, wherein said transparent electrode is made of indium-tin-oxide (ITO) film.

31. A liquid crystal display device, comprising:

a pair of substrates;

a liquid crystal layer interposed between said pair of substrates; and a pixel electrode, a common electrode, and an active element arranged on at least one of said pair of substrates;

in which images are formed by controlling a liquid crystal of the liquid crystal layer by applying a voltage between the pixel electrode and the common electrode; wherein the liquid crystal of said liquid crystal layer has a negative dielectric anisotropy by containing a liquid crystal molecule having cyanobenzene structure in its molecular structure;

any one of said pixel electrode and said common electrode is shaped as a flat-shaped electrode, said pixel electrode and said common electrode are overlapped interposing an insulating film so that said flat-shaped electrode forms a lower side layer to form an additive capacitor; and at least any one of said pixel electrode and said common electrode is composed of a transparent conductive film.

* * * * *